United States Patent
Tsunoda et al.

(10) Patent No.: US 9,707,930 B2
(45) Date of Patent: Jul. 18, 2017

(54) AIR CONDITIONER FOR VEHICLE

(71) Applicant: HONDA MOTOR CO., LTD., Minato-ku, Tokyo (JP)

(72) Inventors: Isao Tsunoda, Utsunomiya (JP); Kazuma Ichikawa, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 608 days.

(21) Appl. No.: 13/950,705

(22) Filed: Jul. 25, 2013

(65) Prior Publication Data
US 2014/0041404 A1 Feb. 13, 2014

(30) Foreign Application Priority Data

Aug. 10, 2012 (JP) ................................. 2012-178342

(51) Int. Cl.
*F25D 21/00* (2006.01)
*F25D 21/06* (2006.01)
(Continued)

(52) U.S. Cl.
CPC .............. *B60S 1/023* (2013.01); *B60H 1/321* (2013.01); *B60H 2001/3261* (2013.01); *F25D 21/006* (2013.01)

(58) Field of Classification Search
CPC . B60S 1/023; B60H 1/321; B60H 2001/3261; F25D 21/006; G01R 29/0821
(Continued)

(56) References Cited

U.S. PATENT DOCUMENTS

| 4,406,133 A | 9/1983 | Saunders et al. |
| 4,563,877 A * | 1/1986 | Harnish ............... F25D 21/002 |
| | | 62/156 |

(Continued)

FOREIGN PATENT DOCUMENTS

| JP | 57-087550 A | 6/1982 |
| JP | S61-11539 A | 1/1986 |

(Continued)

OTHER PUBLICATIONS

Extended European search report dated Oct. 10, 2013 issued in corresponding application.
(Continued)

*Primary Examiner* — Henry Crenshaw
(74) *Attorney, Agent, or Firm* — Carrier Blackman & Associates, P.C.; William D. Blackman; Jingli Wang

(57) ABSTRACT

An air conditioner for a vehicle includes: a compressor that compresses a heat exchange medium; an internal heat exchanger that performs heat exchange between the heat exchange medium expelled from the compressor and air for air conditioning introduced inside a vehicle compartment; and an external heat exchanger that performs heat exchange between the heat exchange medium expelled from the internal heat exchanger and external air, wherein the air conditioner for a vehicle calculates a temperature difference between an external air temperature and a discharge port temperature of the external heat exchanger, calculates an average value of the temperature difference, and performs a defrosting operation which melts frost adhered to the external heat exchanger when an amount of change of the average value is equal to or greater than a first predetermined value.

5 Claims, 12 Drawing Sheets

(51) Int. Cl.
*G05D 23/00* (2006.01)
*B60S 1/02* (2006.01)
*B60H 1/32* (2006.01)

(58) Field of Classification Search
USPC .................. 62/80, 154, 155, 156; 700/300
See application file for complete search history.

(56) References Cited

U.S. PATENT DOCUMENTS

| | | | | |
|---|---|---|---|---|
| 4,618,268 | A * | 10/1986 | Horner | G01K 13/10 374/102 |
| 5,473,306 | A * | 12/1995 | Adell | B60Q 1/143 307/10.8 |
| 5,586,448 | A | 12/1996 | Ikeda et al. | |
| 5,727,395 | A * | 3/1998 | Guo | F25D 21/006 62/155 |
| 5,765,382 | A * | 6/1998 | Manning | F25D 21/006 62/154 |
| 5,797,273 | A * | 8/1998 | Guo | F25D 21/006 62/155 |
| 5,816,054 | A * | 10/1998 | Yoo | F25B 5/04 62/154 |
| 5,842,355 | A * | 12/1998 | Kalis | F25D 17/062 62/127 |
| 5,931,009 | A * | 8/1999 | Choi | F24F 11/0086 62/154 |
| 2011/0017529 | A1* | 1/2011 | Durney | B60L 1/003 180/65.1 |

FOREIGN PATENT DOCUMENTS

| | | | |
|---|---|---|---|
| JP | 09-203570 | A | 8/1997 |
| JP | 10-103818 | A | 4/1998 |
| JP | H10-1-3818 | * | 4/1998 |
| JP | 11-257719 | A | 9/1999 |
| JP | 2000-283611 | A | 10/2000 |
| JP | 2010254291 | A | 11/2010 |
| JP | 2012-030734 | A | 2/2012 |
| WO | 2012/098966 | A1 | 7/2012 |

OTHER PUBLICATIONS

Office Action and search report issued in the corresponding Chinese Patent Application No. 201310317806.9.

Japanese Office Action with a mailing date of Aug. 26, 2014, issued in the corresponding JP Patent Application 2012-178342 with the English translation of thereof.

Japanese Office Action issued in corresponding patent application JP 2012-178342 with the English translation thereof with a mailing date of Jan. 21, 2014.

* cited by examiner

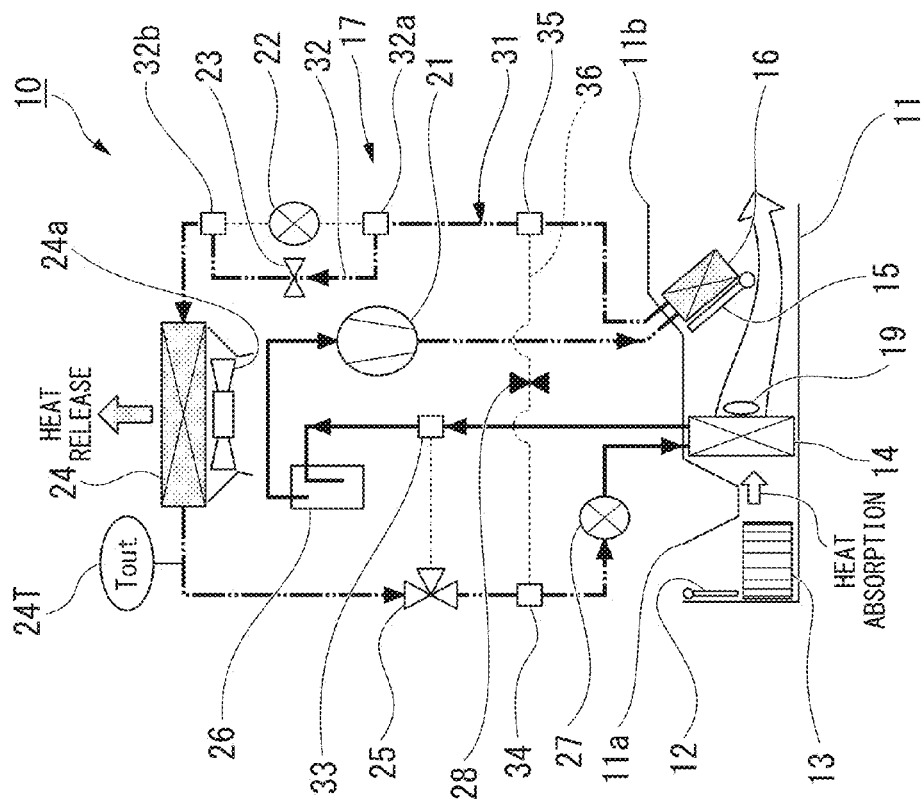
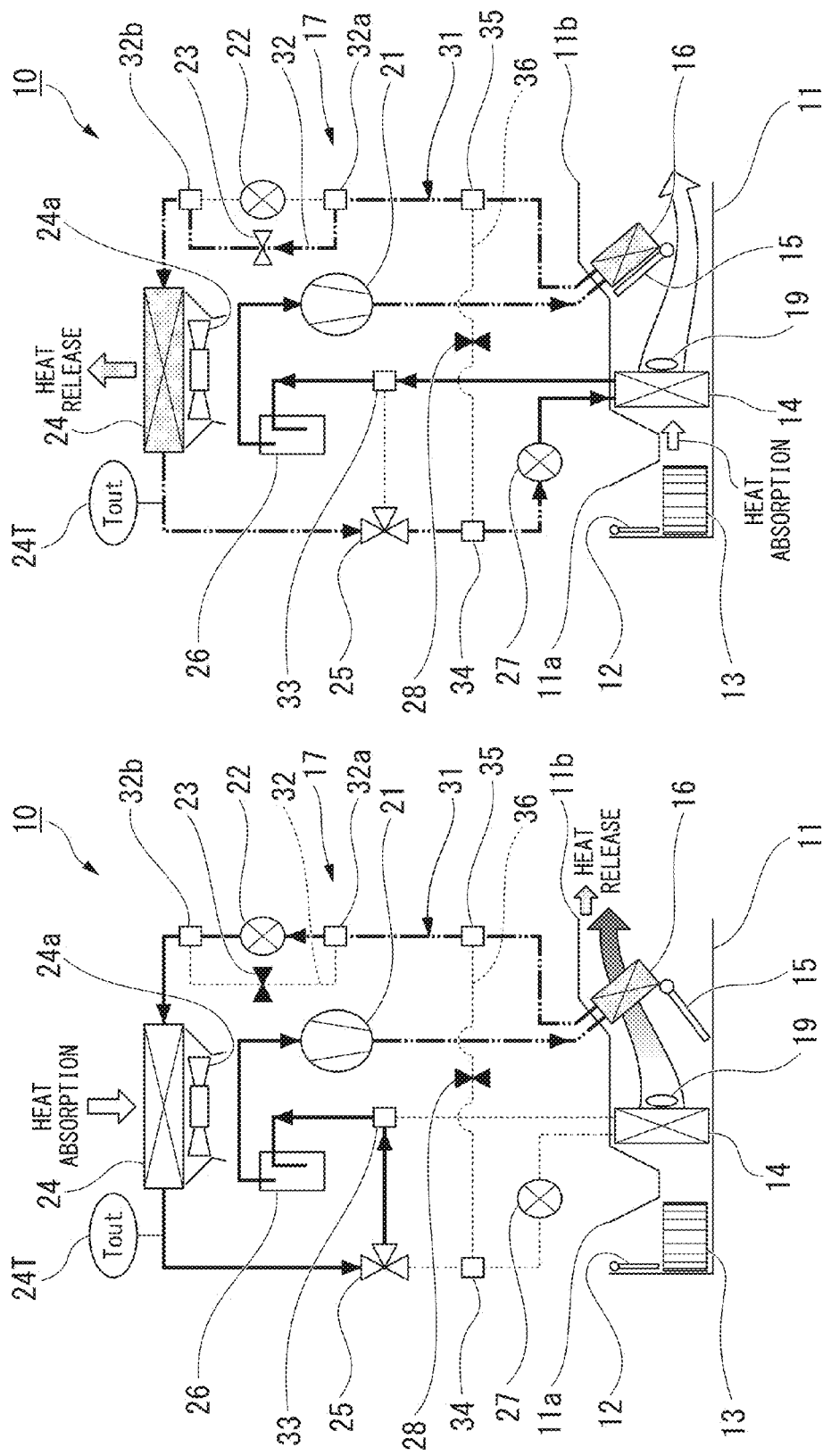

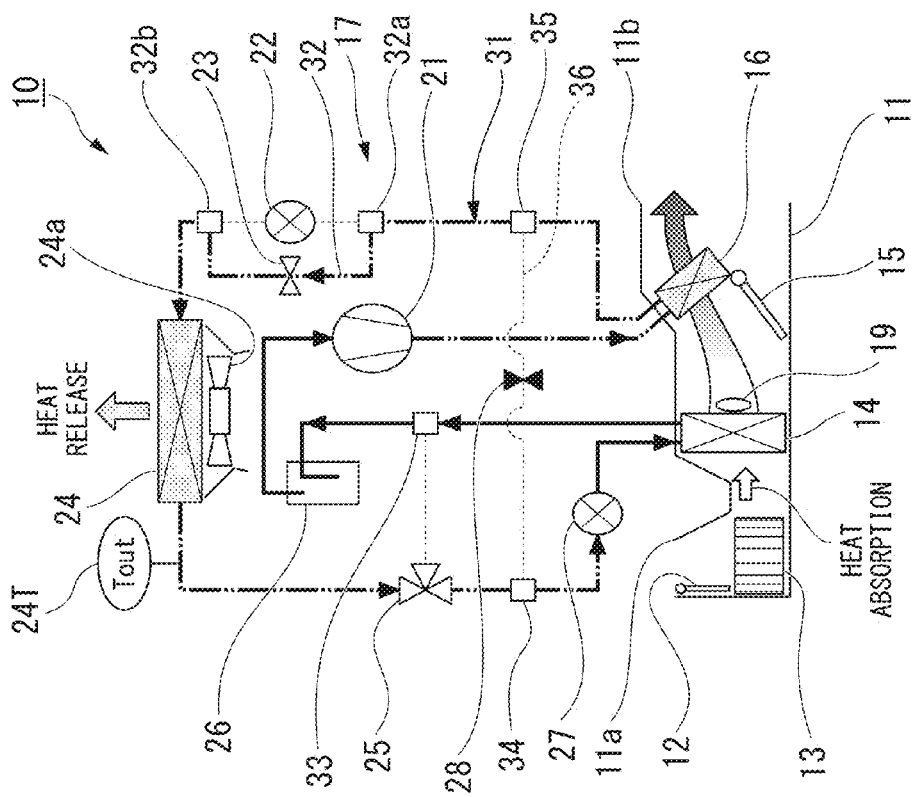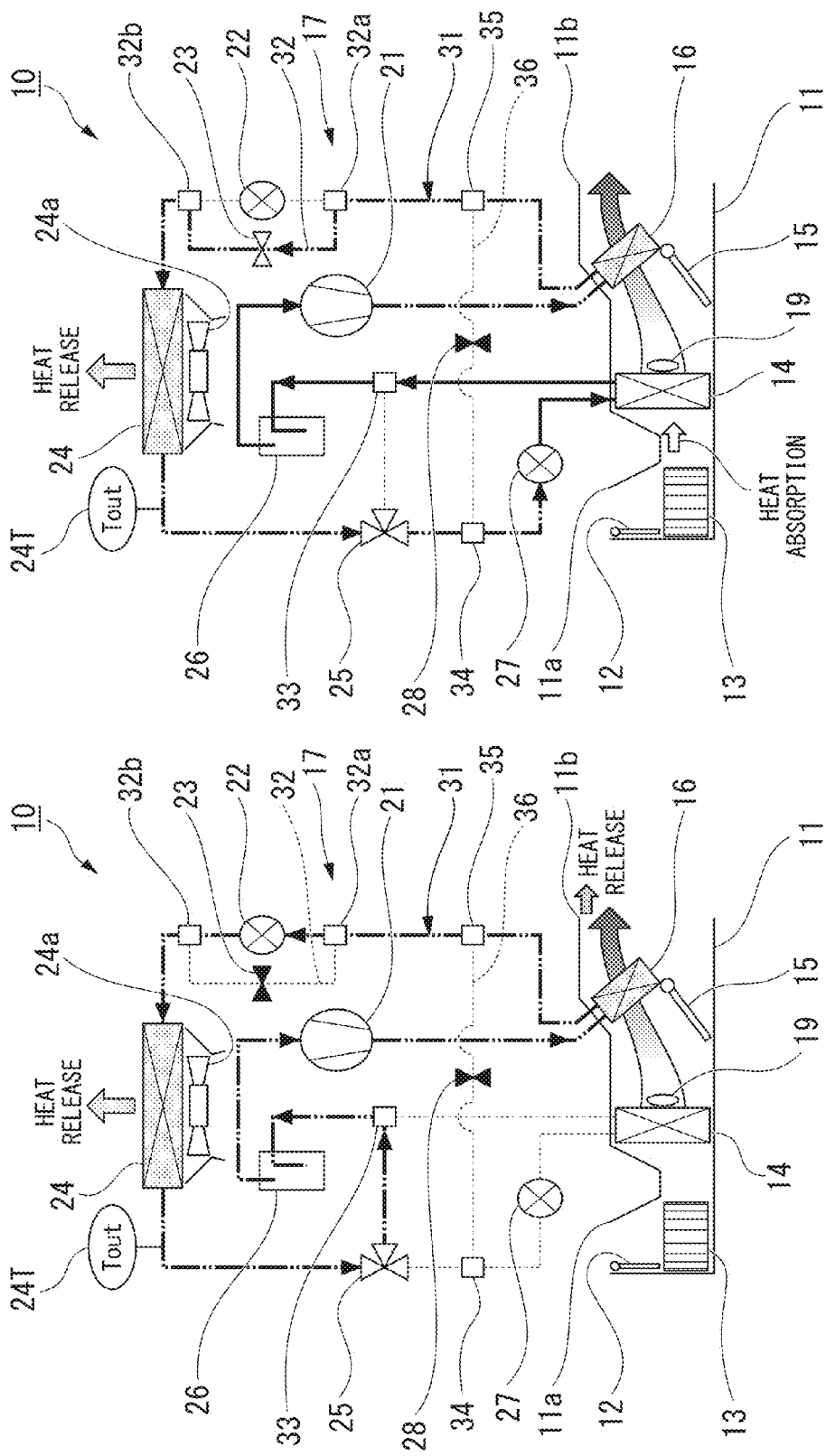

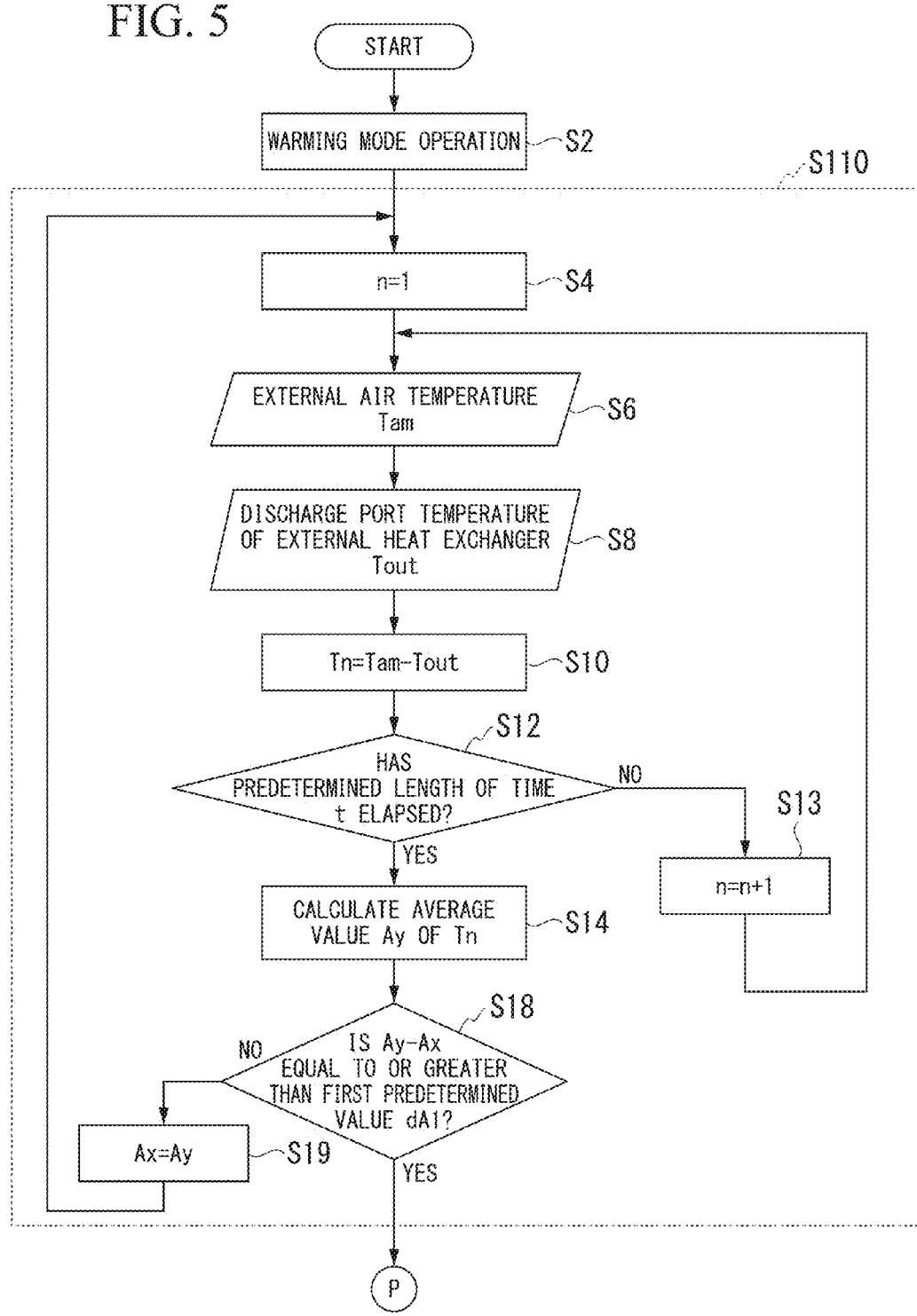

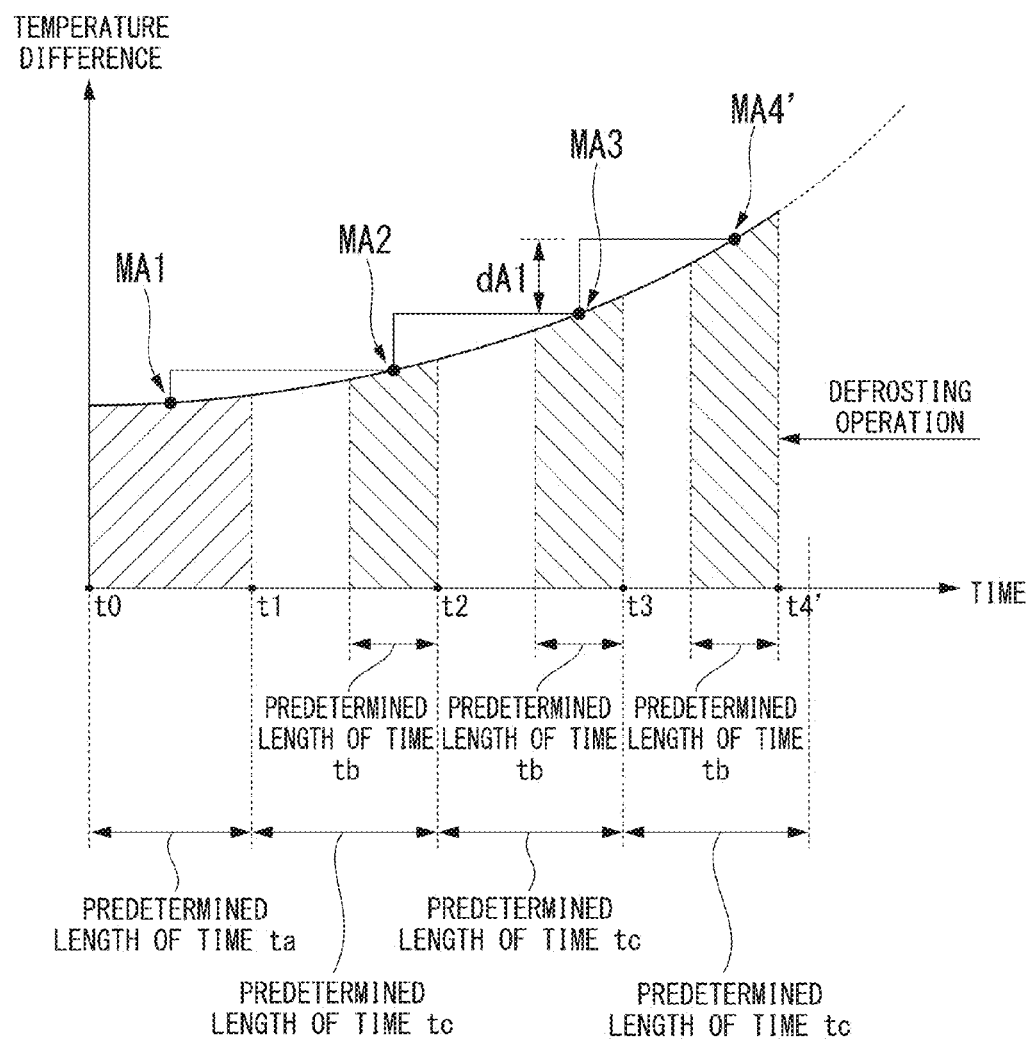

AIR CONDITIONER FOR VEHICLE

CROSS-REFERENCE TO RELATED APPLICATION

Priority is claimed on Japanese Patent Application No. 2012-178342, filed Aug. 10, 2012, the contents of which are incorporated herein by reference.

BACKGROUND

Field of the Invention

The present invention relates to an air conditioner for a vehicle.

Description of Related Art

In electric vehicles, because the engine cooling water cannot be used to heat the vehicle interior, an air conditioner for a vehicle that utilizes a heat pump cycle is employed.

In this air conditioner for a vehicle, because the heat exchange medium absorbs heat during a warming operation in the external heat exchanger, if the outside air temperature is extremely low, then in some cases, frost formation may occur on the surface of the external heat exchanger. If frost formation does occur, then because the heat transfer rate deteriorates so that the heat absorption is inadequate, a problem arises in that the warming effect inside the vehicle compartment is insufficient.

Therefore, a heat-pump-type air conditioner is known that determines a frosting state based on the temperature difference between the outside air temperature detected by an outside air temperature sensor and the temperature of an external heat exchanger detected by a temperature sensor for the external heat exchanger so as to start the control for defrosting (for example, refer to Japanese Unexamined Patent Application Publication No. 2000-283611).

SUMMARY

In general, when the heat absorption of the external heat exchanger is inadequate due to frost formation, the temperature difference becomes large.

However, because the temperature difference also becomes large when the outside air temperature or the temperature of the external heat exchanger has drastically (temporarily or locally) changed, a problem arises in that the conventional air conditioner cannot accurately determine whether or not frost formation has occurred.

In addition, an increase in the temperature difference arising from a decrease in performance of the external heat exchanger comes from not only frost formation but a decrease in the outside air temperature and a decrease in the vehicle speed (poor ventilation). Accordingly, it is also necessary to consider the outside air temperature and the vehicle speed and the like for accurately determining whether or not frost formation has occurred, and thus a problem arises in that whether or not frost formation has occurred cannot be accurately determined only by the temperature difference. In order to determine accurately whether or not frost formation has occurred, it is required to alter the threshold value of the temperature difference to start the control for defrosting depending on the outside air temperature and the vehicle speed, and therefore an enormous amount of test data is needed for individual vehicles.

It is an object of an aspect of the present invention to provide an air conditioner for a vehicle that is capable of accurately determining whether or not frost formation has occurred.

In the air conditioner for a vehicle according to an aspect of the present invention, the following structures are employed in order to achieve the aforementioned object.

(1) The air conditioner for a vehicle according to one aspect of the present invention includes: a compressor that compresses a heat exchange medium; an internal heat exchanger that performs heat exchange between the heat exchange medium expelled from the compressor and air for air conditioning introduced inside a vehicle compartment; and an external heat exchanger that performs heat exchange between the heat exchange medium expelled from the internal heat exchanger and external air, wherein the air conditioner for a vehicle calculates an average value of a temperature difference between an external air temperature and a temperature of the external heat exchanger, and performs a defrosting operation which melts frost adhered to the external heat exchanger when an amount of change of the average value is equal to or greater than a first predetermined value.

According to the above-described aspect (1), because an average value of the temperature difference is calculated, it is possible to prevent making a misjudgment that frost formation has occurred when an external air temperature (outside air temperature) or a temperature of the external heat exchanger has drastically changed.

In addition, an increase in the temperature difference arising from a decrease in performance of the external heat exchanger comes from not only frost formation but a decrease in the temperature of the external air and a decrease in the vehicle speed. Note that an increasing rate of the temperature difference is limited (relatively small) in a case of the decrease in the external air temperature and the decrease in the vehicle speed, while an increasing rate of the temperature difference is large in a case of frost formation (because frost formation evolves). According to the above-described aspect, because a determination is made that frost formation has occurred on the external heat exchanger when an amount of change of the average value of the temperature difference is equal to or greater than a first predetermined value, it is possible to determine accurately whether or not frost formation has occurred.

(2) In the above-described aspect (1), the air conditioner for a vehicle may perform the defrosting operation when the amount of change of the average value is equal to or greater than a second predetermined value that is greater than the first predetermined value, if a determination has been made that a remaining amount of battery consumed by the vehicle is less than a predetermined remaining amount.

According to the above-described aspect (2), because a frequency of the defrosting operation is decreased, it is possible to reduce an amount of consumption of electric power to save a remaining amount of battery. Moreover, because an occasion to supply cold air inside the vehicle compartment is reduced due to a decrease in a frequency of the defrosting operation, the comfort of the occupant can be ensured.

When a remaining amount of battery is less than the predetermined remaining amount, it is anticipated to stop driving of the vehicle after a short length of time in order to charge a battery. Although the air conditioner for a vehicle is used allowing a frosted state when a frequency of defrosting is decreased, if the use continues only for a short length of time, the negative impact therefrom can be minimized. Moreover, even if defrosting is completely performed by a defrosting operation for a long length of time, the comfort of the occupant is not hampered because the occupant leaves the vehicle compartment after stopping driving of the vehicle.

According to the aspect of the present invention, because an average value of a temperature difference is calculated, it is possible to prevent making a misjudgment that frost formation has occurred when an external air temperature or a temperature of an external heat exchanger has drastically changed. In addition, it is possible to determine accurately whether or not frost formation has occurred, by making a determination that frost formation has occurred on the external heat exchanger when an amount of change of an average value of a temperature difference is equal to or greater than a first predetermined value.

BRIEF DESCRIPTION OF THE DRAWINGS

FIG. 2A is a view showing a warming mode operating state of the air conditioner for a vehicle.

FIG. 2B is a view showing a cooling mode operating state of the air conditioner for a vehicle.

FIG. 4A is a view showing a hot gas operating state, which is also a state of a defrosting operation of the air conditioner for a vehicle.

FIG. 4B is a view showing a cooling operating state for performing defrosting, which is also a state of the defrosting operation of the air conditioner for a vehicle.

FIG. 5 is a first flowchart showing a method of performing the defrosting operation in the air conditioner for a vehicle according to a first embodiment.

FIG. 12 is a view explaining a determination to start defrosting according to the third embodiment.

DESCRIPTION OF THE EMBODIMENTS

Hereinafter, an air conditioner for a vehicle according to an embodiment of the present invention will be described with reference made to the appended drawings.

(Air Conditioner for a Vehicle)

An air conditioner for a vehicle 10 according to the present embodiment is mounted, for example, in an electric vehicle that is not equipped with an internal-combustion engine as a vehicle drive source, or the like, and is capable of executing a dehumidification warming mode operation by means of a heat pump cycle.

Figure 1:
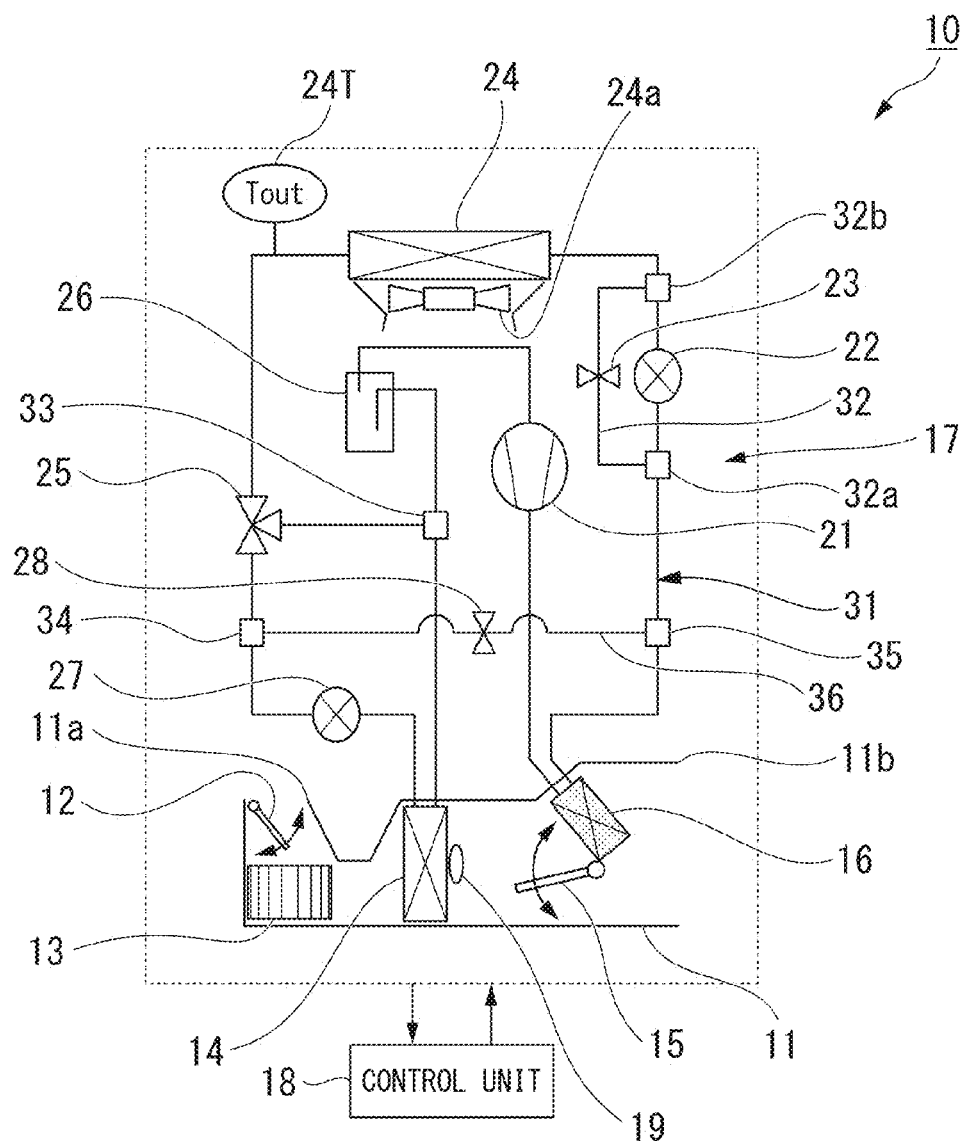
FIG. 1 is a structural view of an air conditioner for a vehicle according to an embodiment.

As is shown in FIG. 1, the air conditioner for a vehicle 10 is provided with an intake port opening/closing door 12, an air blower 13, an evaporator 14, a damper 15, and an internal condenser 16 that are provided in this sequence running from an air intake port 11a, which is provided on the upstream side of a ventilation duct 11, towards an air diffuser port 11b, which is provided on the downstream side thereof.

Furthermore, the air conditioner for a vehicle 10 is also provided with a heat pump cycle 17, which is provided with the evaporator 14 and the internal condenser 16, a control unit 18, and an evaporator sensor 19.

The air intake port 11a of the ventilation duct 11 is provided such that it is possible to introduce internal air (i.e., air inside the vehicle compartment) and external air (i.e., air outside the vehicle compartment) into the interior of the air conditioner for a vehicle 10.

The air diffuser port 11b of the ventilation duct 11 is provided such that it is possible to blow air for air conditioning from inside the air conditioner for a vehicle 10 into the vehicle compartment.

The opening and closing of the intake port opening/closing door 12 are controlled, for example, via the control of the control unit 18, which is provided such that it is possible to alter the amounts of internal air (i.e., air from inside the vehicle compartment) and external air (i.e., air from outside the vehicle) that are introduced into the interior of the ventilation duct 11.

The air blower 13 is driven in accordance with a drive voltage that is applied, for example, via the control of the control unit 18, and blows air (i.e., both internal air and external air) that has been introduced through the air intake port 11a from the upstream side of the ventilation duct 11 towards the air diffuser port 11b on the downstream side thereof, namely, towards the evaporator 14 and the internal condenser 16.

The evaporator (i.e., the internal heat exchanger) 14 performs heat exchange between a low-pressure heat exchange medium that has been supplied to the interior thereof and the atmosphere inside the vehicle compartment (i.e., air for air conditioning), and, for example, cools the air that is passing through the evaporator 14 inside the ventilation duct 11 via the heat absorption that occurs when the heat exchange medium evaporates.

The damper 15 is capable of being rotated, for example, by a motor (not shown) that is driven by the control of the control unit 18, and the air volume ratio of the air that is passed through the evaporator 14 by the action of the blower 13 is adjusted by the opening angle thereof (for example, the opening angle relative to the ventilation path heading towards the internal condenser 16) between the volume of air that is directed towards the internal condenser 16, and the volume of air that bypasses the internal condenser 16 and is discharged into the vehicle interior.

The internal condenser 16 (internal heat exchanger) is capable of releasing heat using the high-temperature, high-pressure heat exchange medium that has been supplied to the interior thereof, and, for example, heating air (air for air conditioning) that is introduced through the interior of the ventilation duct 11 into the internal condenser 16.

The heat pump cycle 17 is provided, for example, with a compressor 21, the internal condenser 16, a heating expansion valve 22, a cooling electromagnetic valve 23, an external heat exchanger 24, a three-way valve 25, a gas-liquid separator 26, a cooling expansion valve 27, and a dehumidification electromagnetic valve 28.

The compressor 21 is driven, for example, by a drive force from a motor (not shown) that is driven by the control of the control unit 18, and suctions a gas-phase heat exchange medium from the gas-liquid separator 26. The compressor 21 then compresses this heat exchange medium, and expels the high-temperature, high-pressure heat exchange medium to the internal condenser 16.

The internal condenser 16 is connected by a first flow path 31 to the external heat exchanger 24, and the heating expansion valve 22 and the cooling electromagnetic valve 23 are placed in parallel on the first flow path 31 between the internal condenser 16 and the external heat exchanger 24.

The heating expansion valve 22 is known as a diaphragm valve, and it expands the heat exchange medium that has been discharged from the internal condenser 16, and then expels the heat exchange medium, which is at a low temperature and low-pressure and is in a two-phase gas-liquid spray state, into the external heat exchanger 24.

The cooling electromagnetic valve 23 is provided on a bypass flow path 32 that bypasses the heating expansion valve 22 via a first branching pipe 32a, which is on the internal condenser 16 side, and a second branching pipe 32b, which is on the external heat exchanger 24 side, between the internal condenser 16 and the external heat exchanger 24, and opening and closing actions thereof are controlled, for example, by the control unit 18.

For example, the cooling electromagnetic valve 23 is set to a closed state when either a warming mode operation or a dehumidification warming mode operation is being executed, and is set to an open state when a cooling mode operation is being executed.

As a consequence of this, when, for example, the warming mode operation or the dehumidification warming mode operation is being executed, the heat exchange medium that is discharged from the internal condenser 16 passes through the heating expansion valve 22 and flows in a low-temperature, low-pressure state into the external heat exchanger 24.

When, on the other hand, the cooling mode operation is being executed, the heat exchange medium discharged from the internal condenser 16 passes through the cooling electromagnetic valve 23 and flows in a high-temperature state into the external heat exchanger 24.

The external heat exchanger 24 is, for example, an externally located condenser, and performs heat exchange between the heat exchange medium flowing into the interior thereof and the atmosphere outside the vehicle (external air).

In addition, a temperature sensor that measures a temperature of the external heat exchanger 24 is provided. Specifically, a discharge port temperature sensor 24T that measures the temperature of the heat exchange medium flowing out from the discharge port of the external heat exchanger 24 is provided on the downstream side of the external heat exchanger 24.

Note that, as the temperature sensor that measures the temperature of the external heat exchanger 24, a temperature sensor that measures a surface temperature of the external heat exchanger 24 may be provided.

For example, when the warming mode operation or the dehumidification warming mode operation is being executed, the external heat exchanger 24 is able to absorb heat from the atmosphere outside the vehicle using the low-temperature, low-pressure heat exchange medium that is flowing inside it, and, for example, raise the temperature of the heat exchange medium via the heat absorbed from the atmosphere outside the vehicle.

In contrast, when the cooling mode operation is being executed, the external heat exchanger 24 is able to release heat to the atmosphere outside the vehicle via the high-temperature heat exchange medium that is flowing inside it, and, for example, cool the heat exchange medium by means of this heat release to the atmosphere outside the vehicle and by ventilation air supplied from a condenser fan 24a.

The three-way valve 25 is connected to the external heat exchanger 24, to a junction pipe 33 located on the gas-liquid separator 26 side, and to a third branching pipe 34 located on the cooling expansion valve 27 side, so as to be able to switch the expelling of the heat exchange medium flowing out from the external heat exchanger 24 between the gas-liquid separator 26 and the cooling expansion valve 27, and this switching action is controlled, for example, by the control unit 18.

For example, when the warming mode operation or the dehumidification warming mode operation is being executed, the three-way valve 25 expels the heat exchange medium discharged from the external heat exchanger 24 to an inflow port (not shown) of the junction pipe 33 located on the gas-liquid separator 26 side.

On the other hand, when a cooling mode operation is being executed, the three-way valve 25 expels the heat exchange medium discharged from the external heat exchanger 24 to the third branching pipe 34 located on the cooling expansion valve 27 side.

The gas-liquid separator 26 is connected between an outflow port (not shown) of the junction pipe 33 and an intake port (not shown) of the compressor 21, and separates the heat exchange medium flowing out from the outflow port of the junction pipe 33 into a gas and a liquid, and also causes the gas-phase heat exchange medium to be suctioned into the compressor 21.

The cooling expansion valve 27 is known as a diaphragm valve, and is connected between the third branching pipe 34 and an inflow port (not shown) of the evaporated 14. In accordance with the opening angle controlled, for example, by the control unit 18, the cooling expansion valve 27 expands the heat exchange medium flowing out from the third branching pipe 34, and then expels the heat exchange medium, which is at a low temperature and low-pressure and is in a two-phase gas-liquid spray state, into the evaporator 14.

The evaporator 14 is connected between the cooling expansion valve 27 and the junction pipe 33, and is provided with an inflow port (not shown) that is connected to the third branching pipe 34, and an outflow port (not shown) that is connected to the inflow port (not shown) of the junction pipe 33.

The dehumidification electromagnetic valve 28 is provided on a second flow path 36 that branches off from the first flow path 31 by means of a fourth branching pipe 35, which is provided on the first flow path 31 between the internal condenser 16 and the first branching pipe 32a, and is connected to the third branching pipe 34, and the opening and closing actions thereof are controlled, for example, by the control unit 18.

For example, when the warming mode operation or the cooling mode operation is being executed, the dehumidification electromagnetic valve 28 is set to a closed state, and when the dehumidification warming mode operation is being executed, it is set to an open state.

As a consequence, for example, when the warming mode operation or the cooling mode operation is being executed, the heat exchange medium discharged from the internal condenser 16 passes through the fourth branching pipe 35 and flows only along the first flow path 31 as it travels towards the external heat exchanger 24.

In contrast, when the dehumidification warming mode operation is being executed, the heat exchange medium discharged from the internal condenser 16 is divided at the fourth branching pipe 35 between the first flow path 31 and the second flow path 36, and one portion thereof flows along the first flow path 31 heading towards the external heat exchanger 24, while the other portion thereof flows along the second flow path 36 so as to pass the dehumidification electromagnetic valve 28 and the third branching pipe 34 as it heads towards the cooling expansion valve 27.

The control unit 18 controls operations of the air conditioner for a vehicle 10 based, for example, on command signals input by an operator via suitable switches (not shown) or the like, or on the signals of detection results output from the evaporator sensor 19, or the like, and controls the switching between warming mode operations, cooling mode operations, and dehumidification warming mode operations.

The evaporator sensor 19 is placed in a position, for example, on the downstream side of the evaporator 14 inside the ventilation duct 11. The evaporator sensor 19 detects the temperature of air passing through the evaporator 14, and outputs signals showing these detection results to the control unit 18.

The air-conditioner for a vehicle 10 according to the present embodiment has the above-described structure. Next, operations of the air-conditioner for a vehicle 10 will be described.

(Warming Mode Operation)

Firstly, as is shown, for example, in FIG. 2A, when the air conditioner for a vehicle 10 is performing a warming mode operation, the damper 15 is set to an open state such that air that has passed through the evaporator 14 is introduced into the internal condenser 16. In addition, the cooling electromagnetic valve 23 and the dehumidification electromagnetic valve 28 are set to a closed state, and the three-way valve 25 connects the external heat exchanger 24 to the inflow port of the junction pipe 33.

As a consequence, the high-temperature, high-pressure heat exchange medium expelled from the compressor 21 heats the air inside the ventilation duct 11 using the heat released in the internal condenser 16.

In addition, the heat exchange medium is expanded by the heating expansion valve 22 so as to be placed in a two-phase gas-liquid (liquid-phase rich) spray state. The heat exchange medium then absorbs heat from the atmosphere outside the vehicle in the external heat exchanger 24 and, in a two-phase gas-liquid (gas-phase rich) spray state, passes through the three-way valve 25 and the junction pipe 33 and flows into the gas-liquid separator 26.

The heat exchange medium is then separated into a gas and a liquid in the gas-liquid separator 26, and the gas-phase heat exchange medium is suctioned into the compressor 21.

(Cooling Mode Operation)

As is shown, for example, in FIG. 2B, when the air conditioner for a vehicle 10 is performing a cooling mode operation, the damper 15 is set to a closed state such that air that has passed through the evaporator 14 bypasses the internal condenser 16. In addition, the cooling electromagnetic valve 23 is set to an open state while the dehumidification electromagnetic valve 28 is set to a closed state, and the three-way valve 25 connects the external heat exchanger 24 to the third branching pipe 34.

As a result, the high-temperature, high-pressure heat exchange medium expelled from the compressor 21 passes through the internal condenser 16 and the cooling electromagnetic valve 23, and releases heat to the atmosphere outside the vehicle in the external heat exchanger 24. The heat exchange medium then passes through the three-way valve 25 and the third branching pipe 34 and flows into the cooling expansion valve 27.

The heat exchange medium is then expanded by the cooling expansion valve 27 so that it changes to a two-phase gas-liquid (liquid-phase rich) spray state, and then cools the air inside the ventilation duct 11 due to the heat thereof being absorbed in the evaporator 14.

The two-phase gas-liquid (gas-phase rich) heat exchange medium passes through the junction pipe 33 and enters the gas-liquid separator 26. The gas is then separated from the liquid in the gas-liquid separator 26, and the gas-phase heat exchange medium is suctioned into the compressor 21.

(Dehumidification Warming Mode Operation)

Figure 3:
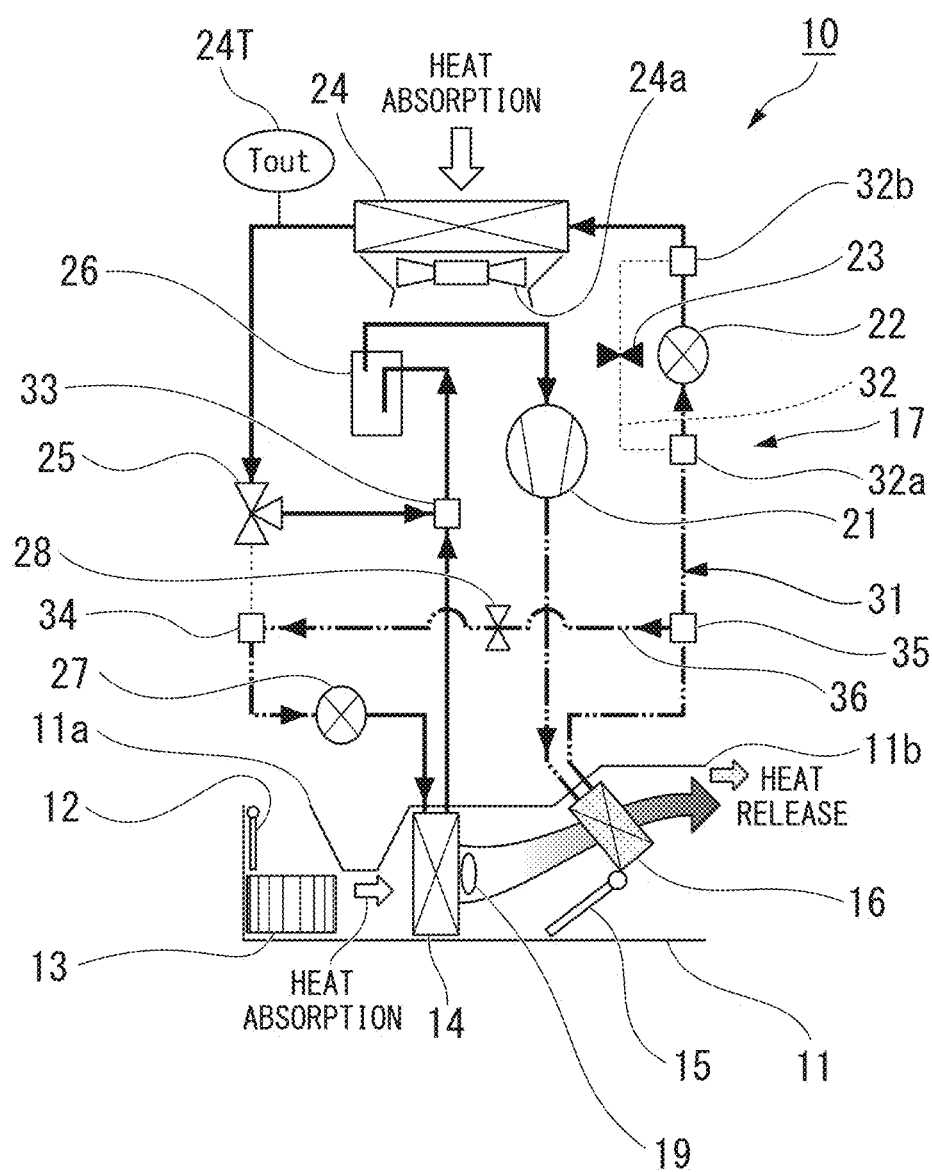
FIG. 3 is a view showing a dehumidification warming mode operating state of the air conditioner for a vehicle.

As is shown, for example, in FIG. 3, when the air conditioner for a vehicle 10 is performing a dehumidification warming mode operation, the damper 15 is set to an open state such that air that has passed through the evaporator 14 is introduced into the internal condenser 16. In addition, the cooling electromagnetic valve 23 is set to a closed state, and the dehumidification electromagnetic valve 28 is set to an open state, and the three-way valve 25 connects the external heat exchanger 24 to the inflow port of the junction pipe 33.

As a consequence, the high-temperature, high-pressure heat exchange medium expelled from the compressor 21 heats the air inside the ventilation duct 11 (namely, the air that has passed through the evaporator 14) by releasing its heat in the internal condenser 16.

The heat exchange medium is then divided at the fourth branching pipe 35 between the first flow path 31 and the second flow path 36, and one portion thereof flows along the first flow path 31 towards the external heat exchanger 24, while the other portion thereof flows along the second flow path 36 and passes the dehumidification electromagnetic valve 28 and the third branching pipe 34 as it travels towards the cooling expansion valve 27.

Namely, one portion of the heat exchange medium flows from the fourth branching pipe 35 into the heating expansion valve 22, and is expanded by the heating expansion valve 22 so as to be changed into a two-phase gas-liquid (liquid-phase rich) spray state. This portion of the heat exchange medium then absorbs heat from the atmosphere outside the vehicle in the external heat exchanger 24, and, in a two-phase gas-liquid (gas-phase rich) spray state, passes through the three-way valve 25 and the junction pipe 33 so as to flow to the gas-liquid separator 26.

On the other hand, the other portion of the heat exchange medium flows from the fourth branching pipe 35 into the cooling expansion valve 27 and is expanded by the cooling expansion valve 27 so as to be changed into a two-phase gas-liquid (liquid-phase rich) spray state. This portion of the heat exchange medium uses the heat absorption of the evaporator 14 to cool the air inside the ventilation duct 11 down to dew point so as to dehumidify it, and then passes through the junction pipe 33 in a two-phase gas-liquid (gas-phase rich) state and flows into the gas-liquid separator 26.

(Defrosting Operation)

During the above-described warming mode operation of the air conditioner for a vehicle, because heat is absorbed from the external air in the external heat exchanger 24, in some case, frost formation occurs on the external heat exchanger 24. If frost formation does occur, then because this causes the heat transfer rate of the external heat exchanger 24 to deteriorate so that the heat absorption is inadequate, the warming effect inside the vehicle compartment is insufficient. Therefore, when it is determined that frost formation has occurred on the external heat exchanger 24 during a warming mode operation, a defrosting operation is performed.

In the defrosting operation of the present embodiment, the operation switches between a defrosting cooling operation and a hot gas operation.

FIGS. 4A and 4B show defrosting operation states of an air conditioner for a vehicle. FIG. 4A shows a hot gas operation state, while FIG. 4B shows a defrosting cooling operation state.

(Hot Gas Operation)

The hot gas operation shown in FIG. 4A resembles the warming mode operation shown in FIG. 2A, however, it differs in the following points. In a warming mode operation, the heating expansion valve 22 is opened to a small aperture diameter, and the heat exchange medium that has been compressed by the compressor 21 is expanded so that it flows into the external heat exchanger 24 and heat is absorbed therefrom by the external heat exchanger 24.

In contrast to this, in a hot gas operation, the heating expansion valve 22 is opened to a large aperture diameter, and the heat exchange medium (i.e., the hot gas) that has been compressed by the compressor 21 is allowed to flow in an unchanged state into the external heat exchanger 24, and the heat thereof is released by the external heat exchanger 24.

When the compressor 21 is compressing the heat exchange medium, the compressor 21 itself is generating heat and that heat is transmitted to the heat exchange medium so that there is an increase in the temperature of the heat exchange medium. The heat exchange medium (i.e., the hot gas) whose temperature has increased flows into the internal condenser 16 where its heat is released and heats the air inside the ventilation duct 11. By doing this, warm air is supplied to the interior of the vehicle compartment.

The heat exchange medium that has flowed out from the internal condenser 16 passes through the heating expansion valve 22 and flows into the external heat exchanger 24. In a hot gas operation, because the heating expansion valve 22 is opened to a large aperture diameter, the heat exchange medium is not expanded by the heating expansion valve 22, and flows in an unchanged state to the external heat exchanger 24.

Because this heat exchange medium releases heat without absorbing any heat in the external heat exchanger 24, the external heat exchanger 24 can be defrosted.

The heat exchange medium flowing out from the external heat exchanger 24 passes through the gas-liquid separator 26 and returns to the compressor 21 so as to complete a cycle.

(Defrosting Cooling Operation)

The defrosting cooling operation shown in FIG. 4B is substantially the same as the cooling mode operation shown in FIG. 2B. In either operation, the heat exchange medium compressed by the compressor 21 flows into the external heat exchanger 24 where it releases heat, and then subsequently flows into the evaporator 14 where it absorbs heat. In this manner, in a defrosting cooling operation, because the heat exchange medium releases heat in the external heat exchanger 24, the external heat exchanger 24 can be defrosted.

The defrosting cooling operation and the cooling mode operation differ in the following points. In a cooling mode operation, the damper 15 is set to a closed state such that the air that is introduced into the ventilation duct 11 and passes through the evaporator 14 bypasses the internal condenser 16. In contrast to this, in a defrosting cooling operation, the damper 15 is set to an open state such that the air that has passed through the evaporator 14 also passes through the internal condenser 16.

In a defrosting cooling operation, in the same way as in a cooling mode operation, because the air inside the ventilation duct 11 is cooled via the heat absorption in the evaporator 14, compared with a warming mode operation, the temperature of the air supplied to the vehicle interior is lowered. In contrast, the heat exchange medium that has been compressed by the compressor 21 and has flowed into the internal condenser 16 releases its heat to the air passing through the internal condenser 16.

Therefore, in the defrosting cooling operation of the present embodiment, the damper 15 is set to an open state such that the air passing through the evaporator 14 also passes through the internal condenser 16. By employing this structure, because the reduction in the temperature of the air supplied to the interior of the vehicle compartment is suppressed, it is possible to alleviate any uncomfortableness felt by a vehicle occupant.

Method of Performing a Defrosting Operation in an Air Conditioner for a Vehicle: First Embodiment A method of performing a defrosting operation in an air conditioner for a vehicle according to a first embodiment will be described below.

Figure 6:
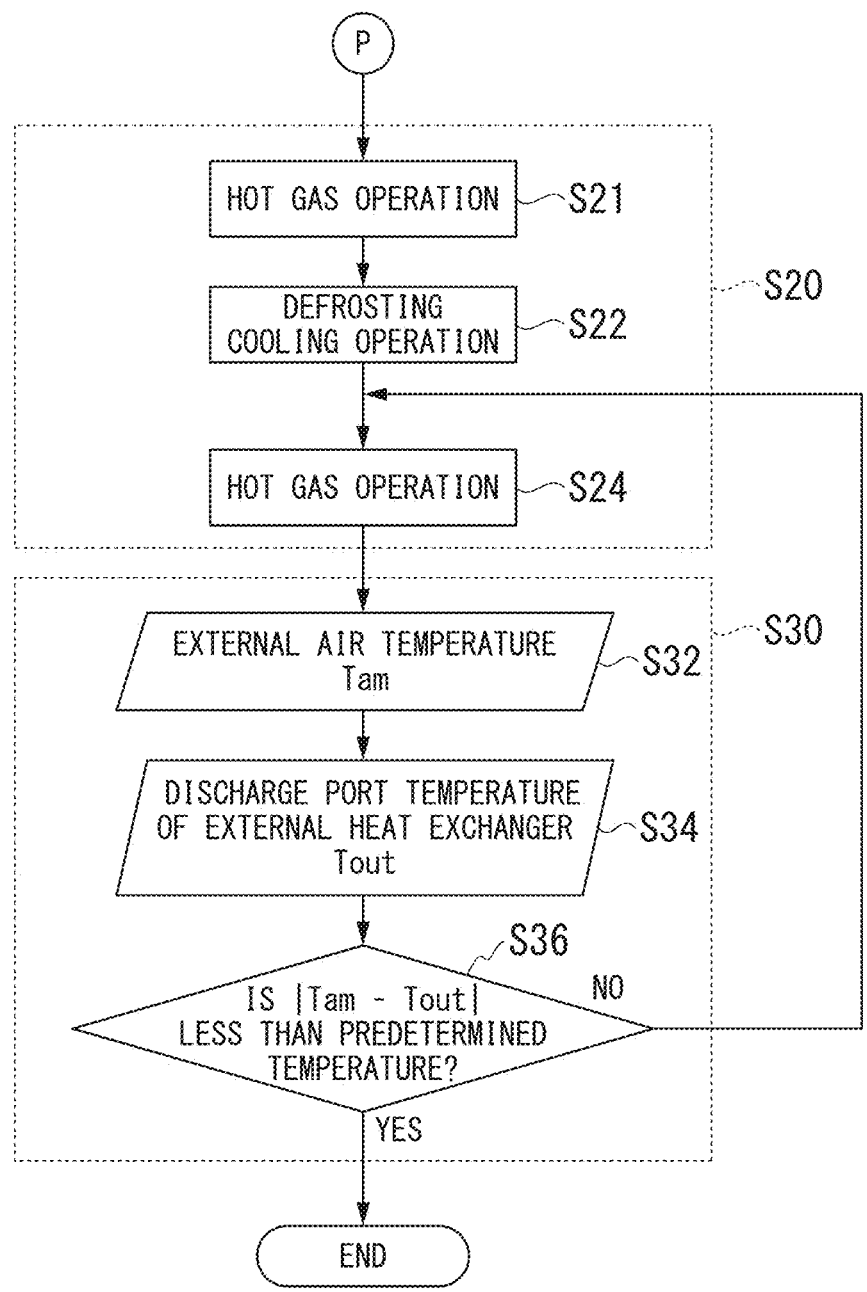
FIG. 6 is a second flowchart showing a method of performing the defrosting operation in the air conditioner for a vehicle according to the first embodiment.

FIG. 5 is a first flowchart showing a method of performing a defrosting operation in an air conditioner for a vehicle according to the first embodiment, while FIG. 6 is a second flowchart. As is shown in FIG. 5, the method of performing a defrosting operation in an air conditioner for a vehicle starts from a warming mode operation state (S2), and then performs a defrosting start determination (S110). Moreover, as is shown in FIG. 6, a defrosting operation (S20) and a defrosting end determination (S30) are performed.

(Defrosting Start Determination)

As shown in FIG. 5, a defrosting start determination is performed in order to determine whether or not frost formation has occurred on the external heat exchanger 24 (i.e., to determine whether or not defrosting is necessary) (S110).

Firstly, an initial value of a measurement frequency of a temperature difference 'n' is set to be unity (S4), and a measurement of a temperature difference 'Tn' between an external air temperature (temperature of external air) and a temperature of the external heat exchanger is started. Specifically, the external air temperature 'Tam' is measured by an external temperature sensor (not shown), and is output to the control unit 18 (S6). In addition, the discharge port temperature 'Tout' of the external heat exchanger 24 is measured by the discharge port temperature sensor 24T, and is output to the control unit 18 (S8). Then, the control unit 18 calculates the temperature difference 'Tn' between the external air temperature 'Tam' and the discharge port temperature 'Tout' of the external heat exchanger 24 (S10).

In a warming mode operation, the heat absorption is performed by the external heat exchanger 24. If frost has formed on the external heat exchanger 24, then because the heat transfer rate of the external heat exchanger 24 will have deteriorated, the heat exchange medium will no longer be able to absorb sufficient heat from the external air. In this case, the temperature difference 'Tn' between the discharge port temperature 'Tout' and the external air temperature 'Tam' is increased without the discharge port temperature 'Tout' of the external heat exchanger 24 rising to a temperature close to that of the external air temperature 'Tam'.

Therefore, there is a higher possibility that frost has been formed on the external heat exchanger 24 as the temperature difference 'Tn' is greater.

Next, a determination is made as to whether a predetermined length of time 't' has elapsed since the initial value of the measurement frequency of a temperature difference 'n' has been set to unity (S12). If the determination in S12 is No, one is added to the measurement frequency of a temperature difference 'n' in S13, the routine returns to S6 and the measurement of a temperature difference is continued. On the other hand, if the determination in S12 is Yes, then the routine proceeds to S14, and calculates an average value 'Ay' of the temperature differences 'Tn' that have been measured during the predetermined length of time 't'.

By calculating the average value 'Ay' of the temperature differences 'Tn' described above, it is possible to prevent making a misjudgment that frost formation has occurred when the external air temperature 'Tam' or the discharge port temperature 'Tout' of the external heat exchanger has drastically (temporarily or locally) changed.

Next, a determination is made as to whether a differential between a currently-calculated average value 'Ay' of a temperature difference and a previously-calculated average value 'Ax' of a temperature difference is equal to or greater than a first predetermined value 'dA1' (S18). Note that, when this is a first time to calculate an average value 'Ay' of a temperature difference, the determination in S18 is defined as No. If the determination in S18 is No, the routine proceeds to S19 where the currently-calculated average value 'Ay' of a temperature difference is substituted into the previously-calculated average value 'Ax' of a temperature difference, and then returns to S4. On the other hand, if the determination in S18 is Yes, it is determined that frost has been formed on the external heat exchanger 24, and thereby a defrosting operation is started.

An increase in a temperature difference 'Tn' arising from a decrease in performance of the external heat exchanger 24 comes from not only frost formation but a decrease in the external air temperature and a decrease in the vehicle speed (poor ventilation). Accordingly, in some cases it is difficult to accurately determine whether or not frost formation has occurred based on only the temperature difference 'Tn' (and the average value 'Ay' of a temperature difference).

However, an increasing rate of the temperature difference 'Tn' is relatively small in a case of a decrease in the external air temperature and a decrease in the vehicle speed, while, in a case of frost formation (along with the evolution of frost formation), an increasing rate of the temperature difference 'Tn' becomes large. For this reason, by evaluating a magnitude of the differential between a currently-calculated average value 'Ay' of a temperature difference and a previously-calculated average value 'Ax' of a temperature difference (i.e., an increasing rate of an average value of a temperature difference, or an amount of change), it is possible to accurately determine whether or not frost formation has occurred. Note that the first predetermined value 'dA1', which is a threshold value for determining frost formation, is obtained in advance by performing experiments or the like.

Figure 7:
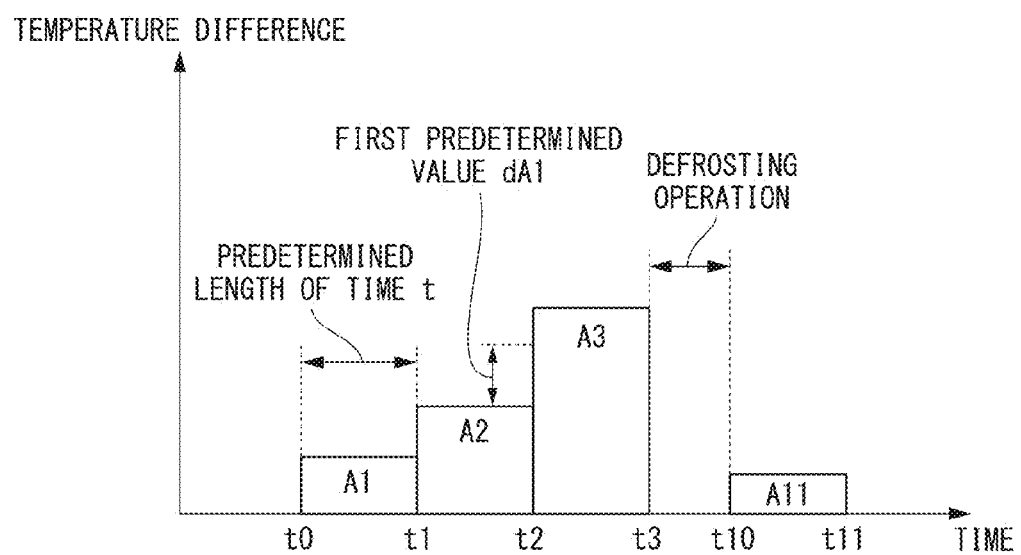
FIG. 7 is a view explaining a determination to start defrosting according to the first embodiment.

FIG. 7 is a view explaining the defrosting start determination according to the first embodiment. The horizontal axis of the graph in FIG. 7 shows a time and the vertical axis shows a temperature difference.

In the example of FIG. 7, a differential between an average value 'A2' of a temperature difference at a time interval from 't1' to 't2' and an average value 'A1' of a temperature difference at a time interval from 't0' to 't1' is less than the first predetermined value 'dA1', while a differential between an average value 'A3' of a temperature difference at a time interval from 't2' to 't3' and the average value 'A2' of a temperature difference at the time interval from 't1' to 't2' is greater than the first predetermined value 'dA1'. Therefore, it is determined that frost has been formed on the external heat exchanger 24 at a time 't3' and a defrosting operation is performed during a time interval from 't3' to 't10'. Note that an average value 'A11' of a temperature difference after the defrosting operation is less than the average value 'A3' of a temperature difference before the defrosting operation.

(Defrosting Operation)

Next, as is shown in FIG. 6, a defrosting operation in which frost adhered to the external heat exchanger 24 is melted is performed (S20). In the defrosting operation, firstly, a hot gas operation is performed (S21), next, a defrosting cooling operation is performed (S22), and then a hot gas operation is again performed (S24).

Firstly, a hot gas operation is performed (S21).

Figure 8:
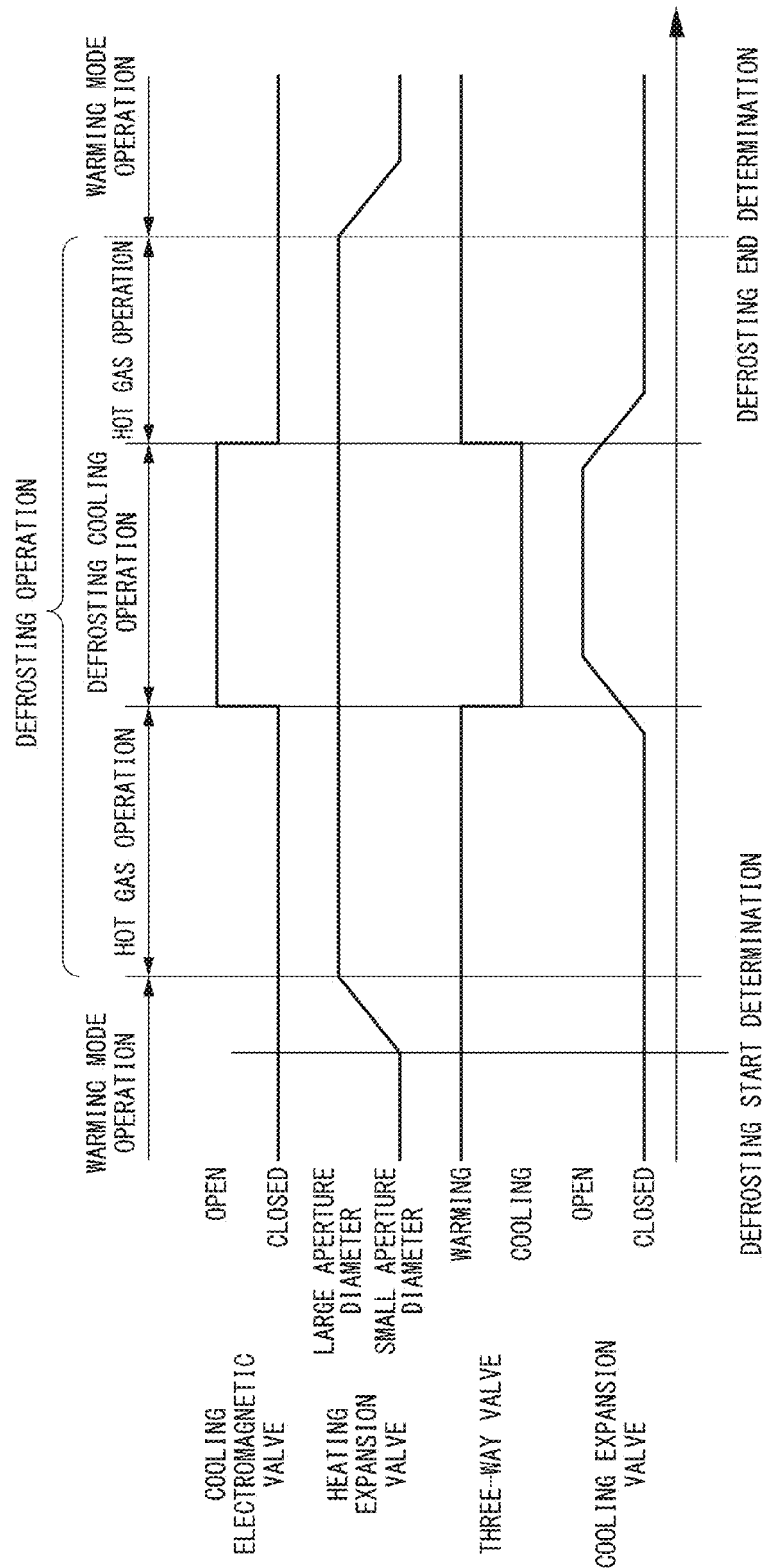
FIG. 8 is a timing chart for performing the defrosting operation.

FIG. 8 is a timing chart of a defrosting operation. At the timing at which a defrosting start determination has been established, the task of increasing the aperture angle of the heating expansion valve 22 from a small aperture diameter to a large aperture diameter is started. Accordingly, the heat exchange medium that has been compressed by the compressor 21 flows into the external heat exchanger 24 without being expanded in the heating expansion valve 22.

As a result, because the heat of the heat exchange medium is released in the external heat exchanger 24, defrost by performing a hot gas operation is started. The first hot gas operation is performed for a predetermined length of time.

Note that because the heat exchange medium is compressed by the compressor 21 to a suitable pressure by performing a hot gas operation in which the cooling electromagnetic valve 23 is closed and only the heating expansion valve 22 is opened to a large aperture diameter, hot gas can be efficiently generated.

Next, a defrosting cooling operation is performed (S22). Specifically, as is shown in FIG. 8, the aperture angle of the heating expansion valve 22 is held at a large aperture diameter. Immediately before a predetermined length of time of the hot gas operation has elapsed, the task of increasing the aperture angle of the cooling expansion valve 27 from a closed state to an open state is started. Next, while the aperture angle of the cooling expansion valve 27 is being increased, the cooling electromagnetic valve 23 is switched from a closed state to an open state. In addition, the outflow port of the three-way valve 25 is switched from the warming side (i.e., the junction pipe 33 side) to the cooling side (i.e., the third branching pipe 34 side).

Accordingly, the heat exchange medium that has been compressed by the compressor 21 flows into the external heat exchanger 24 without being expanded in the heating expansion valve 22. As a result, because the heat of the heat exchange medium is released in the external heat exchanger 24, a defrosting cooling operation is started. This defrosting cooling operation is performed for a predetermined length of time.

Note that the task of increasing the aperture angle of the cooling expansion valve 27 may be started at the same time as the switching of the cooling electromagnetic valve 23 or the three-way valve 25 is being performed. However, by starting to increase the aperture angle of the cooling expansion valve 27 prior to performing the switching of the cooling electromagnetic valve 23 and the three-way valve 25, even if a prolonged length of time is needed to increase the aperture angle of the cooling expansion valve 27, it is possible to quickly start a defrosting cooling operation.

Next, a second hot gas operation is performed (S24). Specifically, as is shown in FIG. 8, immediately before a predetermined length of time of the defrosting cooling operation has elapsed, the task of reducing the aperture angle of the cooling expansion valve 27 from an open state to a closed state is started. Next, while the aperture angle of the cooling expansion valve 27 is being reduced, the cooling electromagnetic valve 23 is switched from an open state to a closed state. In addition, the outflow port of the three-way valve 25 is switched from the cooling side (i.e., the third branching pipe 34 side) to the warming side (i.e., the junction pipe 33 side).

Accordingly, the heat exchange medium that has flowed out from the external heat exchanger 24 bypasses the evaporator 14 and flows into the compressor 21, and thus a hot gas operation is started. The second hot gas operation is performed until a defrosting end determination (described below) is established.

As has been described above, by performing a defrosting operation switching between a hot gas operation and a defrosting cooling operation, it is possible to prevent supplying cold air inside the vehicle compartment, compared with when a defrosting operation is performed solely via a cooling operation.

Moreover, in a defrosting cooling operation in which heat is first absorbed and then released, compared with a hot gas operation in which heat is released without having been absorbed first, a greater quantity of heat can be released. As a result of this, compared with when a defrosting operation is performed solely via a hot gas operation, the defrosting of the external heat exchanger can be performed efficiently and in a short space of time.

Furthermore, by performing a first hot gas operation, defrosting preparations can be made without lowering the temperature of the air that is supplied to the vehicle compartment interior. As a consequence, because a portion of the frost is melted, the time taken by the subsequent defrosting cooling operation can be shortened, so that the length of time that cold air is supplied to the vehicle compartment interior can also be shortened.

In addition, because the operation is restored to a warming mode operation via the second hot gas operation, the transition from a defrosting operation to a warming mode operation can be made smoothly.

Note that in the defrosting operation of the present embodiment, firstly, a hot gas operation was performed, and subsequently, a defrosting cooling operation was performed, and then a hot gas operation was performed again prior to the operation returning to a warming mode operation, however, the configuration of a defrosting operation is not limited thereto.

For example, it is possible to first perform a defrosting cooling operation, and to then perform a hot gas operation prior to returning to a warming mode operation. It is also possible to first perform a hot gas operation, and to then perform a defrosting cooling operation prior to returning to a warming mode operation.

(Defrosting End Determination)

Next, as is shown in FIG. 6, a defrosting end determination that determines whether or not the frost adhered to the external heat exchanger 24 has been removed is performed (S30).

Specifically, in the same way as the defrosting start determination, the external air temperature 'Tam' is measured by the external temperature sensor (not shown), and is output to the control unit 18 (S32). In addition, the discharge port temperature 'Tout' of the external heat exchanger 24 is measured by the discharge port temperature sensor 24T, and is output to the control unit 18 (S34).

The control unit 18 then determines whether an absolute value of the differential between the external air temperature 'Tam' and the discharge port temperature 'Tout' of the external heat exchanger 24 is less than a predetermined temperature (S36). If the result of the determination in S36 is No, the defrosting is determined to have not yet ended, and the routine consequently returns to S24 and the hot gas operation is continued.

If the frost on the external heat exchanger 24 has melted, then the heat transfer rate of the external heat exchanger 24 has improved and the heat absorption from the external air is being performed satisfactorily. Therefore, the discharge port temperature 'Tout' of the external heat exchanger 24 approaches the external air temperature 'Tam', and the difference between the two temperatures is decreased. If the absolute value of the differential between the external air temperature 'Tam' and the discharge port temperature 'Tout' of the external heat exchanger 24 is less than the predetermined temperature (i.e., if the determination in S36 is Yes), then defrosting of the external heat exchanger 24 is determined to have ended. In this case, as is shown in FIG. 8, the aperture angle of the heating expansion valve 22 is decreased from a large aperture diameter to a small aperture diameter, and the hot gas operation is ended.

In the defrosting end determination of the present embodiment, the temperature difference between the external air temperature 'Tam' and the discharge port temperature 'Tout' of the external heat exchanger 24 was evaluated, however, the method of a defrosting end determination is not limited thereto. For example, similarly to the above-described defrosting start determination, an average value of a temperature difference may be evaluated, or a decreasing rate of an average value of a temperature difference may be evaluated.

Consequently, a defrosting operation of the air conditioner for a vehicle according to the first embodiment is ended and the operation returns to a warming mode operation.

As has been described above in detail, the air conditioner for a vehicle according to the embodiment is configured to calculate a temperature difference 'Tn' between an external air temperature 'Tam' and a discharge port temperature 'Tout' of the external heat exchanger 24, also to calculate average values 'Ax' and 'Ay' of the temperature differences 'Tn' during a predetermined length of time 't', and to determine that frost has been formed on the external heat exchanger 24 when an amount of change 'Ay−Ax' of the average value is equal to or greater than a first predetermined value 'dA1', consequently performing a defrosting operation which melts the frost adhered to the external heat exchanger 24.

According to this configuration, because average values 'Ax' and 'Ay' of the temperature differences 'Tn' are calculated, it is possible to prevent making a misjudgment that frost formation has occurred when the external air temperature 'Tam' or the discharge port temperature 'Tout' of the external heat exchanger has drastically changed, or a misjudgment arising from a difference of time constants between temperature sensors, or the like.

In addition, an increase in the temperature difference 'Tn' arising from a decrease in performance of the external heat exchanger 24 occurs not only by frost formation but by a decrease in the external air temperature and a decrease in the vehicle speed. Note that an increasing rate of the temperature difference 'Tn' is relatively small in a case of a decrease in the external air temperature and a decrease in the vehicle speed, while an increasing rate of the temperature difference 'Tn' is large in a case of frost formation (along with advance of frost formation).

Accordingly, by determining that frost formation has occurred on the external heat exchanger 24 when an amount of change 'Ay–Ax' of the average value of the temperature difference is equal to or greater than the first predetermined value 'dA1', it is possible to determine accurately whether or not frost formation has occurred.

As is described above, an increase in the temperature difference 'Tn' arising from a decrease in performance of the external heat exchanger occurs due to not only frost formation but a decrease in the external air temperature and a decrease in the vehicle speed. Accordingly, in order to determine accurately whether or not frost formation has occurred based solely on the temperature difference 'Tn', it is required to alter the threshold value of the temperature difference for determining whether or not frost formation has occurred, depending on the external air temperature and the vehicle speed. Therefore, an enormous amount of test data is needed for each vehicle.

In contrast, in this embodiment, because it is sufficient to have test data confirming that frost formation has occurred when an amount of change 'Ay–Ax' of the average value of the temperature difference is equal to or greater than the first predetermined value 'dA1', it is possible to drastically reduce an amount of test data for accurately determining whether or not frost formation has occurred.

Figure 9:
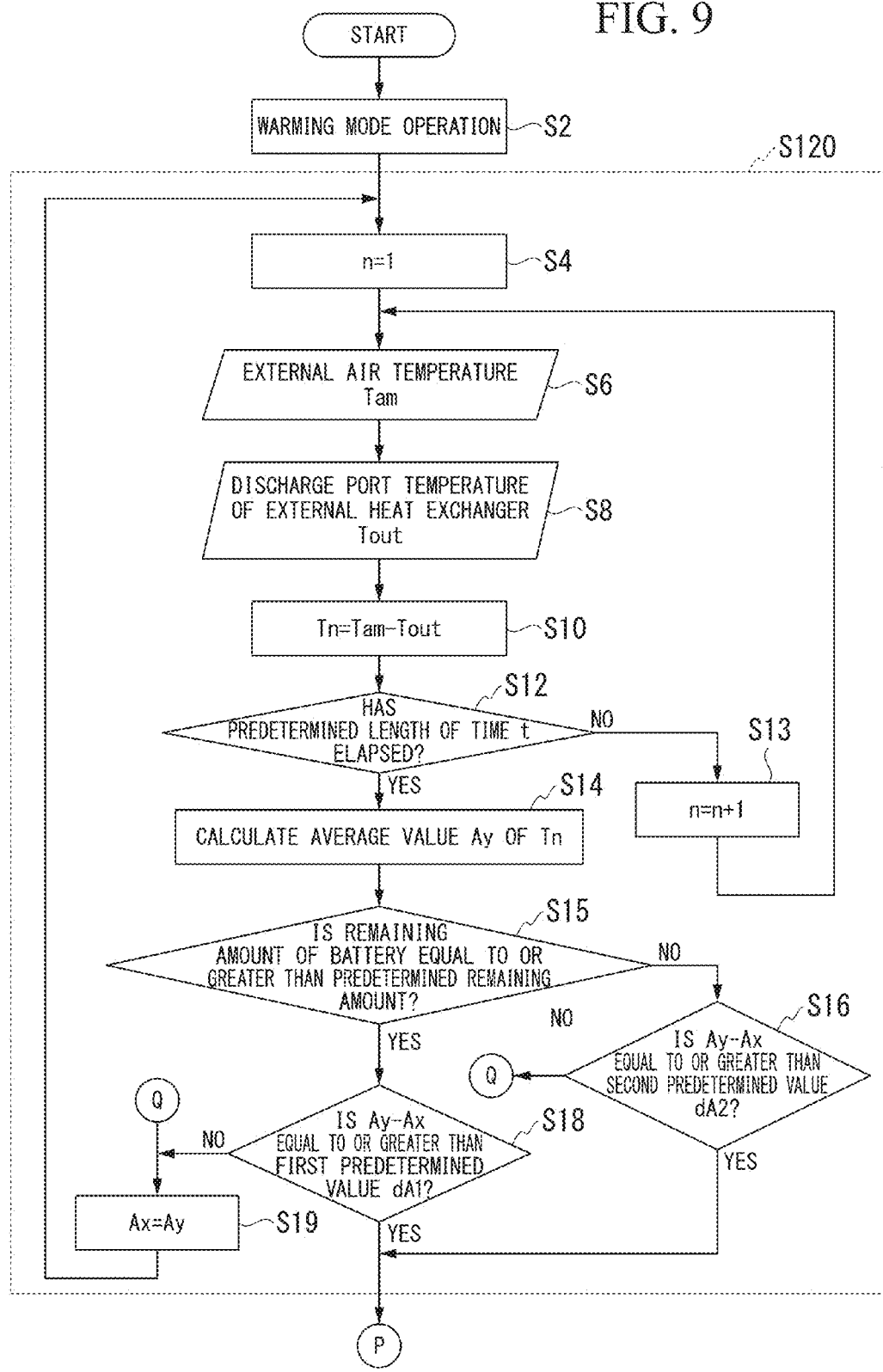
FIG. 9 is a first flowchart for a method of performing a defrosting operation in the air conditioner for a vehicle according to a second embodiment.

Method of Performing a Defrosting Operation in an Air Conditioner for a Vehicle: Second Embodiment FIG. 9 is a first flowchart showing a method of performing a defrosting operation in an air conditioner for a vehicle according to a second embodiment. In the first embodiment, only a first predetermined value 'dA1' is used as a threshold value for the defrosting start determination. However, the second embodiment differs from the first embodiment in that a second predetermined value 'dA2' is used as a threshold value for the defrosting start determination when a remaining amount of battery (hereinafter referred to as SOC) is less than a predetermined remaining amount. Note that description is omitted regarding portions that have the same structure as in the first embodiment.

As is shown in FIG. 9, a defrosting start determination is performed (S120). Note that, the steps are performed in the same way as those in the first embodiment before calculating an average value 'Ay' of a temperature difference in S14.

Next, in the second embodiment, a determination is made as to whether SOC is equal to or greater than a predetermined remaining amount (S15). If the determination in S15 is Yes, then the routine proceeds to S18, in which a defrosting start determination is performed by using a first predetermined value 'dA1' as a threshold value as well as in the first embodiment.

On the other hand, if the determination in S15 is No, then the routine proceeds to S16. In S16, a determination is made as to whether a differential 'Ay–Ax' between a currently-calculated average value 'Ay' of a temperature difference and a previously-calculated average value 'Ax' of a temperature difference is equal to or greater than a second predetermined value 'dA2'. The second predetermined value 'dA2' is a value that is greater than the first predetermined value 'dA1'. Note that, when this is a first time to calculate an average value 'Ay' of a temperature difference, the determination in S18 is defined as No.

If the determination in S18 is No, then the routine proceeds to S19 where the currently-calculated average value 'Ay' of a temperature difference is substituted into the previously-calculated average value 'Ax' of a temperature difference, and then returns to S4. On the other hand, if the determination in S18 is Yes, a defrosting operation is started.

Figure 10:
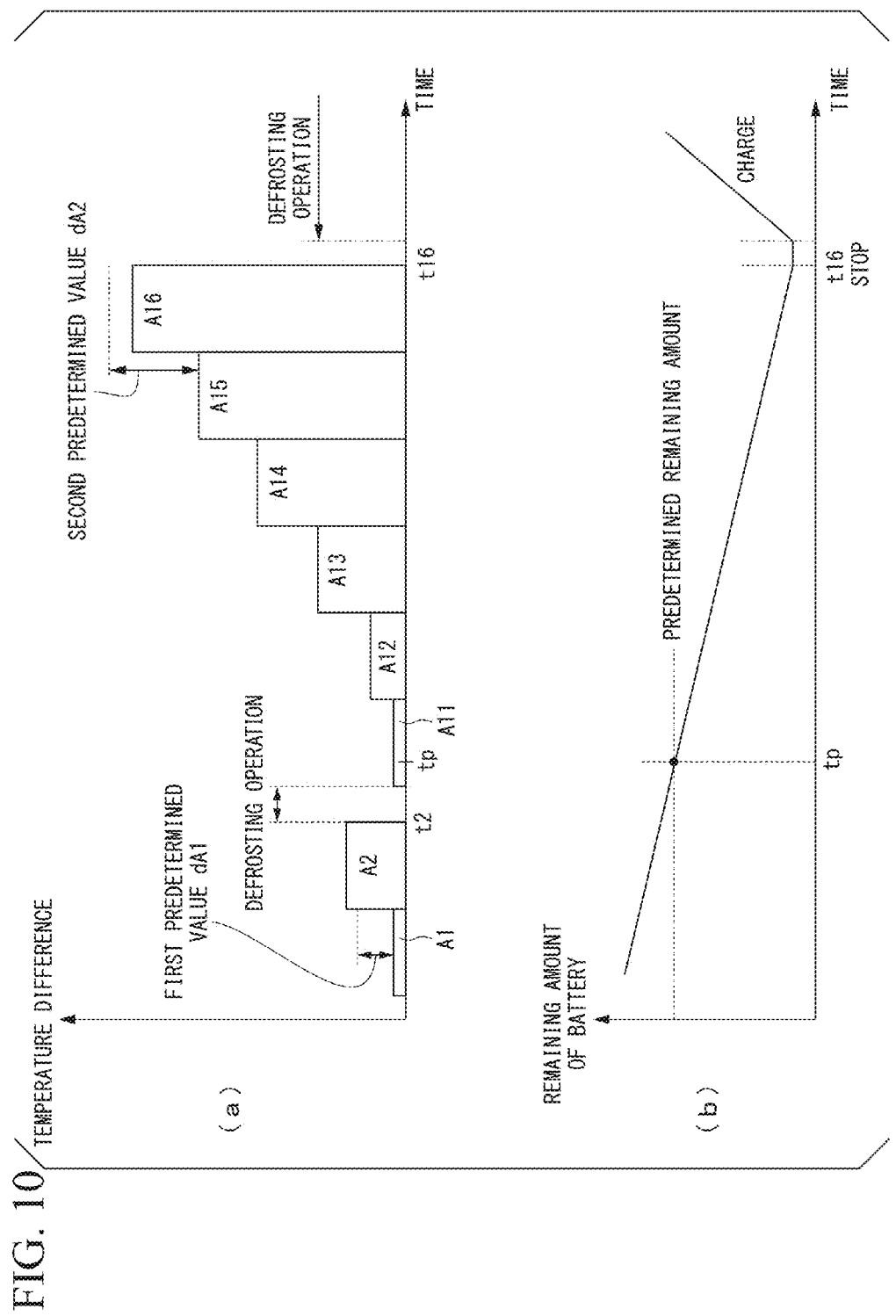
FIG. 10 is a view explaining a determination to start defrosting according to the second embodiment.

FIG. 10 is a view for explaining a defrosting start determination according to the second embodiment. The horizontal axis of each of two graphs in FIG. 10 represents a time. The vertical axis of the graph in FIG. 10 (*a*) shows a temperature difference. The vertical axis of the graph in FIG. 10 (*b*) shows SOC.

As is shown in FIG. 10 (*b*), it is seen that SOC is equal to or greater than a predetermined remaining amount before a time 'tp' (namely, the determination in S15 is Yes). Therefore, as is shown in FIG. 10 (*a*), a differential between average values of temperature differences is compared with a first predetermined value 'dA1' before a time 'tp' (S18). In the example shown in FIG. 10, because a differential 'A2–A1' between average values of temperature differences is greater than the first predetermined value 'dA1' at a time 't2' (<tp), a defrosting operation is started.

On the other hand, after a time 'tp' in FIG. 10 (*b*), SOC is less than the predetermined remaining amount (namely, the determination in S15 is No). Therefore, as is shown in FIG. 10 (*a*), a differential between average values of temperature differences is compared with a second predetermined value 'dA2' after a time 'tp' (S16). The second predetermined value 'dA2' is a value that is greater than the first predetermined value 'dA1'.

In the example shown in FIG. 10, although an ignition switch is turned off at a time 't16' (>'tp') and driving of the vehicle is stopped, a defrosting operation is not started because a difference between average values of temperature differences does not exceed the second predetermined value 'dA2' during a time interval between 'tp' and 't16'. In contrast, as is shown in FIG. 10 (*b*), after stopping driving of the vehicle, a battery is charged and therefore SOC is increasing. As is shown in FIG. 10 (*a*), a defrosting operation is started after stopping driving of the vehicle.

Because cold air is supplied to the interior of the vehicle compartment when performing a defrosting operation, an amount of consumption of electric power in a warming mode operation after the defrosting operation is large. In the second embodiment, because a defrosting operation is started when a differential between average values of temperature differences is equal to or greater than the second predetermined value 'dA2' (>'dA1') if SOC is less than the predetermined remaining amount, a frequency of defrosting is decreased, compared with when SOC is equal to or greater than the predetermined remaining amount. As a result, it is possible to reduce an amount of consumption of electric power to save SOC.

Because cold air is supplied to the interior of the vehicle compartment while performing a defrosting operation, a defrosting operation can be performed in a short length of time or at a low frequency. If a defrosting operation is started when a differential between average values of temperature differences is equal to or greater than the first predetermined value 'dA1' (<'dA2'), defrosting is performed at an initial stage of frost formation, and therefore it is possible to end the defrosting operation in a short length of time. On the other hand, if a defrosting operation is started when a differential between average values of temperature differences is equal to or greater than the second predetermined value 'dA2' (>'dA1'), a frequency of defrosting is decreased, and thereby an occasion to supply cold air inside the vehicle compartment is reduced. Accordingly, even in the latter case, the comfort of the occupant can be ensured.

Note that, when SOC is less than a predetermined remaining amount, it is anticipated to stop driving of the vehicle after a short length of time in order to charge the battery. Although the air conditioner for a vehicle is operated allowing a frosted state when a frequency of defrosting is decreased, if the operation continues only for a short length of time, the negative impact therefrom can be minimized. Moreover, because the occupant leaves the vehicle compartment after stopping driving of the vehicle, the comfort of the occupant is not hampered even if defrosting is completely performed by a defrosting operation for a long length of time.

In addition, the predetermined remaining amount in S15 can be set to a remaining amount with which stopping of driving of the vehicle for charging the battery is required due to a decrease of SOC down close to a lower limit within a length of time, during which a negative impact by operating the air conditioner for a vehicle while keeping a frosted state can be allowed. This predetermined remaining amount is obtained in advance by an experiment or the like.

Following a defrosting start determination (S120) shown in FIG. 9, a defrosting operation (S20) and a defrosting end determination (S30) are performed similarly as the first embodiment shown in FIG. 6.

Consequently, a defrosting operation of the air conditioner for a vehicle according to the second embodiment is ended and the operation returns to a warming mode operation.

As is described above in detail, the air conditioner for a vehicle according to the second embodiment is configured to perform a defrosting operation when an amount of change 'Ay−Ax' of the average value is equal to or greater than a second predetermined value 'dA2' which is greater than a first predetermined value 'dA1' if a determination that SOC is less than a predetermined remaining amount has been made.

According to this configuration, because a frequency of defrosting is decreased, it is possible to reduce an amount of consumption of electric power to save SOC. In addition, because an occasion to supply cold air into the interior of the vehicle compartment is reduced due to a decrease in a frequency of defrosting, the comfort of the occupant can be ensured.

Figure 11:
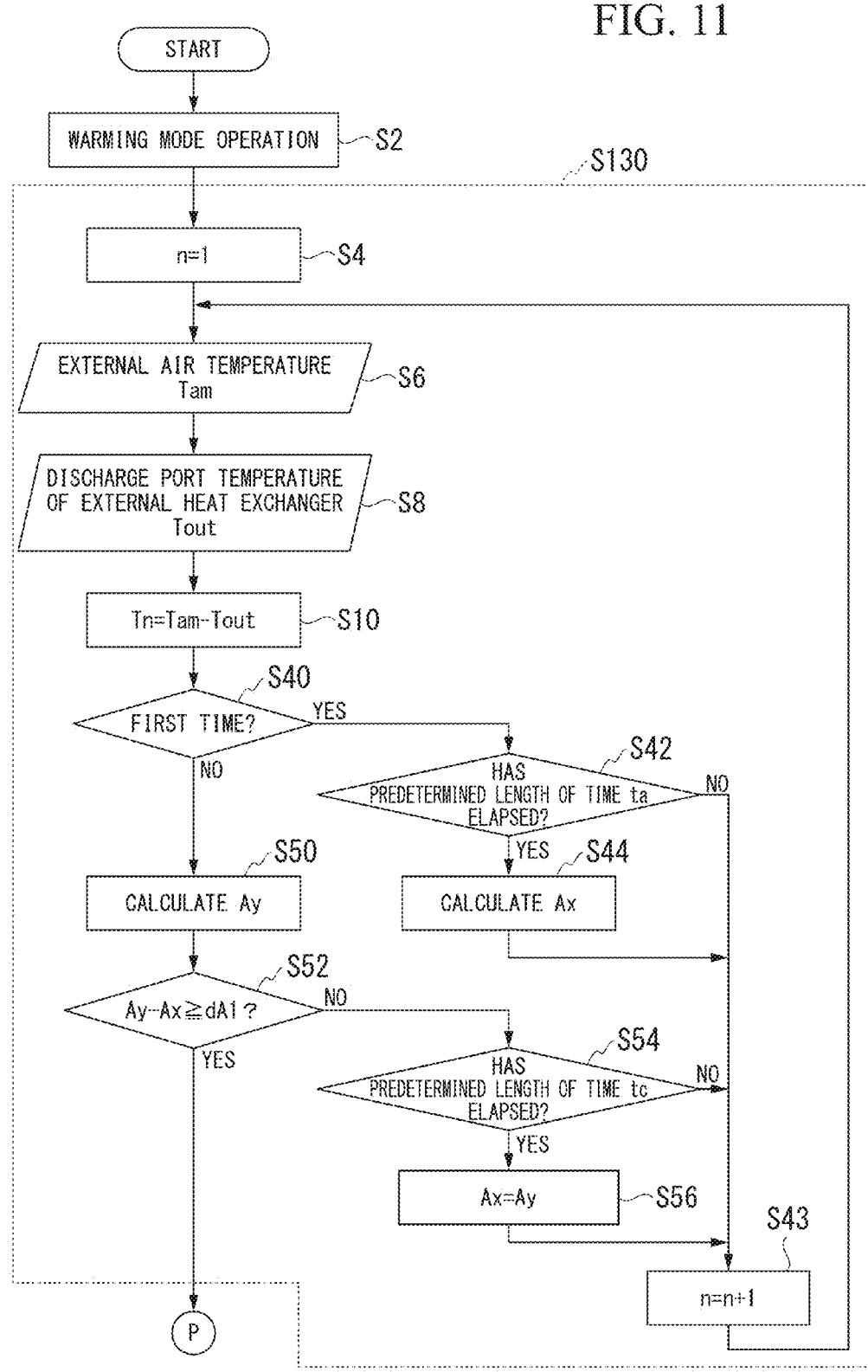
FIG. 11 is a first flowchart for a method of performing a defrosting operation in the air conditioner for a vehicle according to a third embodiment.

Method of Performing a Defrosting Operation in an Air Conditioner for a Vehicle: Third Embodiment FIG. 11 is a first flowchart showing a method of performing a defrosting operation in an air conditioner for a vehicle according to a third embodiment. In the first embodiment, an average value of a temperature difference is calculated for each predetermined length of time and an amount of change of an average value is evaluated. However, the third embodiment differs from the first embodiment in that a moving average value of a temperature difference is calculated and a differential between a moving average value and a reference average value is evaluated. Note that description is omitted regarding portions that have the same structure as in the first embodiment.

As is shown in FIG. 11, a defrosting start determination is performed (S130). Note that, the steps are performed in the same way as those in the first embodiment before calculation of a temperature difference 'Tn' in S10.

Next, in the third embodiment, a determination is made as to whether an average value of a temperature difference 'Tn' is calculated for the first time (S40). If the determination in S40 is Yes, then the routine proceeds to S42, in which whether a predetermined length of time 'ta' has elapsed is determined. If the determination in S42 is No, then one is added to the measurement frequency of a temperature difference 'n' in S43, and the routine returns to S6 to continue the measurement of a temperature difference.

On the other hand, if the determination in S42 is Yes, then the routine proceeds to S44 and calculates an average value 'Ax' of temperature differences 'Tn' that have been measured during a predetermined length of time 'ta' as an initial average value. This average value 'Ax' is a reference average value for calculating a differential with a moving average value 'Ay' described below. After that, in S43, one is added to the measurement frequency of a temperature difference 'n', and the routine returns to S6 to continue the measurement of a temperature difference.

On the other hand, if the determination in S40 is No, then the routine proceeds to S50, and a moving average value 'Ay' of a temperature difference 'Tn' is calculated. The moving average value 'Ay' is an average value of temperature differences 'Tn' that have been measured during the nearest predetermined length of time 'tb'. This predetermined length of time 'tb' may be the same as the above-described predetermined length of time 'ta', or may be different from it.

Next, a determination is made as to whether a differential between a currently-calculated moving average value 'Ay' and a reference average value 'Ax' is equal to or greater than a first predetermined value 'dA1' (S52). This first predetermined value 'dA1' may be the same as the first predetermined value 'dA1' in the first embodiment, or may be different from it.

If the determination in S52 is No, then the routine proceeds to S54, where after having calculated (renewed) the reference average value 'Ax', a determination is made as to whether a predetermined length of time 'tc' has elapsed. This predetermined length of time 'tc' may be the same as the above-described predetermined length of time 'ta', or may be different from it. If the determination in S54 is No, then in S43, one is added to the measurement frequency of a temperature difference 'n'. Then, the routine returns to S6 to measure a temperature difference, and subsequently a new moving average value 'Ay' is calculated in S50.

On the other hand, if the determination in S54 is Yes, then the routine proceeds to S56, where the reference average value 'Ax' is renewed by substituting the currently-calculated moving average value 'Ay' into the reference average value 'Ax'. After that, in S43, one is added to the measurement frequency of a temperature difference 'n', and then the routine returns to S6 to measure a temperature difference. Subsequently, a new moving average value 'Ay' is calculated in S50, and then in S52, a differential between the new moving average value 'Ay' and the renewed reference average value 'Ax' is evaluated.

If the determination in S52 is Yes, then a defrosting operation is started. Namely, a defrosting start determination (S130) shown in FIG. 11 is ended, and a defrosting operation (S20) and a defrosting end determination (S30) are performed similarly as the first embodiment shown in FIG. 6.

As a consequence, a defrosting operation of the air conditioner for a vehicle according to the third embodiment is ended, and the operation returns to a warming mode operation.

FIG. 12 is a view for explaining a defrosting start determination according to the third embodiment. The horizontal axis of the graph in FIG. 12 represents a time, while the vertical axis represents a temperature difference. At a time 't1' when a predetermined length of time 'ta' has elapsed from a time when a defrosting start determination is started, an average value 'MA1' of temperature differences 'Tn' that have been measured during the predetermined length of time 'ta' is calculated. In the graph shown in FIG. 12, because a temperature difference is monotonously increased, a temperature difference at a substantially middle time in the predetermined length of time 'ta' is an average value 'MA1'. This average value 'MA1' is defined as an initial reference average value.

After the time 't1', a moving average value 'MA2' of temperature differences 'Tn' that have been measured during the nearest predetermined length of time 'tb' is sequentially calculated. Then, a differential between the moving average value 'MA2' and the reference average value 'MA1' is calculated, and is compared with a first predetermined value 'dA1'.

In FIG. 12, although a predetermined length of time 'tc' has elapsed from the time 't1' when the initial reference average value 'MA1' has been calculated, a differential between the moving average value 'MA2' and the reference average value 'MA1' is less than the first predetermined value 'dA1'. In this case, the moving average value 'MA2' at a time 't2' when a predetermined length of time 'tc' has elapsed from the time 't1' is set as a new reference average value, and thereby a reference average value is renewed. After the reference average value has been renewed and before a predetermined length of time 'tc' elapses, a differential between a moving average value 'MA3' and a reference average value 'MA2' after renewal is calculated, and is compared with the first predetermined value 'dA1'.

In FIG. 12, before a predetermined length of time 'tc' elapses from a time 't3', a differential between a moving average value 'MA4'' calculated at a time 't4'' and a reference average value 'MA3' becomes greater than the first predetermined value 'dA1'. Therefore, a defrosting operation is started at this time 't4''.

As has been described above in detail, the air conditioner for a vehicle according to the third embodiment is configured to calculate a moving average value 'Ay' of a temperature difference 'Tn' between an external air temperature 'Tam' and a discharge port temperature 'Tout' of the external heat exchanger, and to determine that frost has formed on the external heat exchanger when a differential 'Ay−Ax' between a moving average value 'Ay' and a reference average value 'Ax' is equal to or greater than a first predetermined value 'dA1', thereby performing a defrosting operation.

In an air conditioner for a vehicle that utilizes a heat pump cycle, when frost begins to be formed on an external heat exchanger, because a surface temperature of the external heat exchanger is made to be reduced in order to ensure an amount of heat absorption, frost is further formed. Accordingly, an increasing rate of a temperature difference 'Tn' between an external (outside) air temperature 'Tam' and a discharge port temperature 'Tout' of the external heat exchanger becomes large.

Consequently, it is possible to determine accurately whether or not frost formation has occurred by making a determination that frost has been formed on the external heat exchanger when a differential 'Ay−Ax' between a moving average value 'Ay' and a reference average value 'Ax' is equal to or greater than a first predetermined value 'dA1'.

Moreover, because a moving average value 'Ay' is used so that a determination is sequentially made as to whether or not frost formation has occurred, it is possible to start defrosting promptly.

In addition, in the third embodiment, a structure in which a reference average value is renewed by setting a moving average value that has been calculated for each predetermined length of time 'tc' as a reference average value is employed. Thereby, because it is possible to evaluate an increasing rate of a temperature difference during a predetermined length of time 'tc', a determination can be made accurately as to whether or not frost formation has occurred.

Note that, the technical scope of the present invention is not limited to the above-described embodiments and a variety of modifications can be made to the above-described embodiments without departing from the scope of the present invention. Accordingly, it should be understood that the structures in the embodiments described and illustrated above are exemplary of the invention and can be suitably altered.

For example, in the third embodiment, a differential between a moving average value and a reference average value was evaluated. However, a differential between a currently-calculated moving average value and a most-recently calculated moving average value may be evaluated.

What is claimed is:

1. An air conditioner for a vehicle comprising:
a control unit;
a compressor that compresses a heat exchange medium;
an internal heat exchanger that performs heat exchange between the heat exchange medium expelled from the compressor and air for air conditioning introduced inside a vehicle compartment;
and an external heat exchanger that performs heat exchange between the heat exchange medium expelled from the internal heat exchanger and external air,
wherein said control unit is configured to:
calculate a first moving average value of a temperature difference between an external air temperature and a temperature of the external heat exchanger for a first period of time;
calculate a second moving average value of a temperature difference between an external air temperature and a temperature of the external heat exchanger for a second period of time;
calculate a moving average value difference between the second moving average value and the first moving average value;
perform a defrosting operation which melts frost adhered to the external heat exchanger when the moving average value difference is equal to or greater than a first predetermined value;
wherein the air conditioner is operable to perform the defrosting operation even during the middle of the second period of time when the moving average value difference becomes equal to or greater than the first predetermined value.

2. The air conditioner for a vehicle according to claim 1, wherein said control unit is configured to perform the defrosting operation when the moving average value difference is equal to or greater than a second predetermined value that is greater than the first predetermined value, if a determination has been made that a remaining amount of battery charge which is not yet consumed by the vehicle is less than a predetermined remaining amount.

3. The air conditioner for a vehicle according to claim 1, wherein said control unit is configured to perform the defrosting operation when a remaining amount of battery charge not yet consumed by the vehicle is equal to or greater than a predetermined remaining amount and the moving average value difference is equal to or greater than the first predetermined value.

4. An air conditioner for a vehicle comprising a control unit;

a compressor which compresses a heat exchange medium;

an internal heat exchanger which performs heat exchange between the heat exchange medium expelled from the compressor and air for air conditioning introduced inside a vehicle compartment; and an external heat exchanger which performs heat exchange between the heat exchange medium expelled from the internal heat exchanger and external air, wherein the control unit is configured to:

calculate a first moving average value of a temperature difference between an external air temperature and a temperature of the external heat exchanger during a first period of time;

calculate a second moving average value of a temperature difference between an external air temperature and a temperature of the external heat exchanger during a second period of time;

perform a defrosting operation which melts frost adhered to the external heat exchanger when an amount of a change of moving average values, that is a difference between the second moving average value and the first moving average value, is equal to or greater than a first predetermined value; and terminate the defrosting operation when an absolute value of a difference between the external air temperature and the temperature of the external heat exchanger is less than a predetermined value;

wherein the air conditioner is operable to perform the defrosting operation even during the middle of the second period of time when the moving average value difference becomes equal to or greater than the first predetermined value.

5. An air conditioner for a vehicle comprising a control unit;

a compressor which is operable to compress a heat exchange medium;

an internal heat exchanger which performs heat exchange between the heat exchange medium expelled from the compressor and air for air conditioning introduced inside a vehicle compartment;

and an external heat exchanger which performs heat exchange between the heat exchange medium expelled from the internal heat exchanger and external air, wherein the control unit is configured to:

calculate a first moving average value of a temperature difference between an external air temperature and a temperature of the external heat exchanger during a first period of time, calculate a second moving average value of a temperature difference between an external air temperature and a temperature of the external heat exchanger during a second period of time, compare the first and second average values to determine an amount of change of moving average values;

check a remaining amount of charge in a vehicle battery and compare the remaining amount of charge to a predetermined remaining amount;

if the remaining amount of charge in the vehicle battery is greater than the predetermined remaining amount and the amount of change of the moving average values is equal to or greater than a first predetermined value, perform a defrosting operation which melts frost adhered to the external heat exchanger;

wherein the defrosting operation is performed during the middle of the second period of time when the difference in moving average values becomes equal to or greater than the first predetermined value; and if the remaining amount of charge in the vehicle battery is less than the predetermined remaining amount, and the amount of change of the moving average values is equal to or greater than a second predetermined value, which is greater than the first predetermined value, perform a defrosting operation.

* * * * *